United States Patent [19]

Firoozmand

[11] Patent Number: 5,210,749
[45] Date of Patent: May 11, 1993

[54] CONFIGURATION OF SRAMS AS LOGICAL FIFOS FOR TRANSMIT AND RECEIVE OF PACKET DATA

[75] Inventor: Farzin Firoozmand, Cupertino, Calif.

[73] Assignee: Advanced Micro Devices, Inc., Sunnyvale, Calif.

[21] Appl. No.: 529,363

[22] Filed: May 29, 1990

[51] Int. Cl.$^5$ .............................. H04J 3/02; H04J 3/24
[52] U.S. Cl. .................................. 370/85.1; 370/85.4; 370/85.6; 370/94.1
[58] Field of Search .................... 370/60, 60.1, 85.1, 370/85.4, 85.5, 85.6, 85.12, 85.15, 94.1, 110.1; 340/825.05, 825.5, 825.51, 825.52; 359/115, 118, 135

[56] References Cited

U.S. PATENT DOCUMENTS

| | | | |
|---|---|---|---|
| 4,635,254 | 1/1987 | Tulpule et al. | 370/85.1 |
| 4,663,706 | 5/1987 | Allen et al. | 364/200 |
| 4,866,704 | 9/1989 | Bergman | 370/85.5 |
| 4,878,219 | 10/1989 | Kaufman et al. | 370/85.5 |
| 4,914,652 | 4/1990 | Nguyen | 370/85.5 |
| 4,920,534 | 4/1990 | Adelmann et al. | 370/94.1 |
| 4,930,121 | 5/1990 | Shiobara | 370/85.6 |
| 4,964,113 | 10/1990 | Geyer et al. | 370/85.5 |

Primary Examiner—Douglas W. Olms
Assistant Examiner—Alpus H. Hsu
Attorney, Agent, or Firm—Lowe, Price, LeBlanc & Becker

[57] ABSTRACT

Data arranged in packets are transferred between a system memory and a network bus through a SRAM configured by software pointers as first in-first out memories for transmitting (transmit FIFO) and for receiving (receive FIFO). The packets of data stored in the transmit and receive FIFOs are demarked from each other and classified by tag and status bits at the end of the last word of each packet. Data to be transmitted on the network bus is transferred from the system memory to the transmit FIFO, and data received from the network is stored in the receive FIFO. To maximize data throughput, when either at least a predetermined amount of data or a complete packet is stored in the transmit FIFO, the data is transmitted to the network while data is being received from the system memory. When at least a predetermined amount of data is stored in the receive FIFO, data is transferred to the system memory while network data is incoming from the network. One application of the invention is in a Fiber Distributed Data Interface (FDDI).

48 Claims, 13 Drawing Sheets

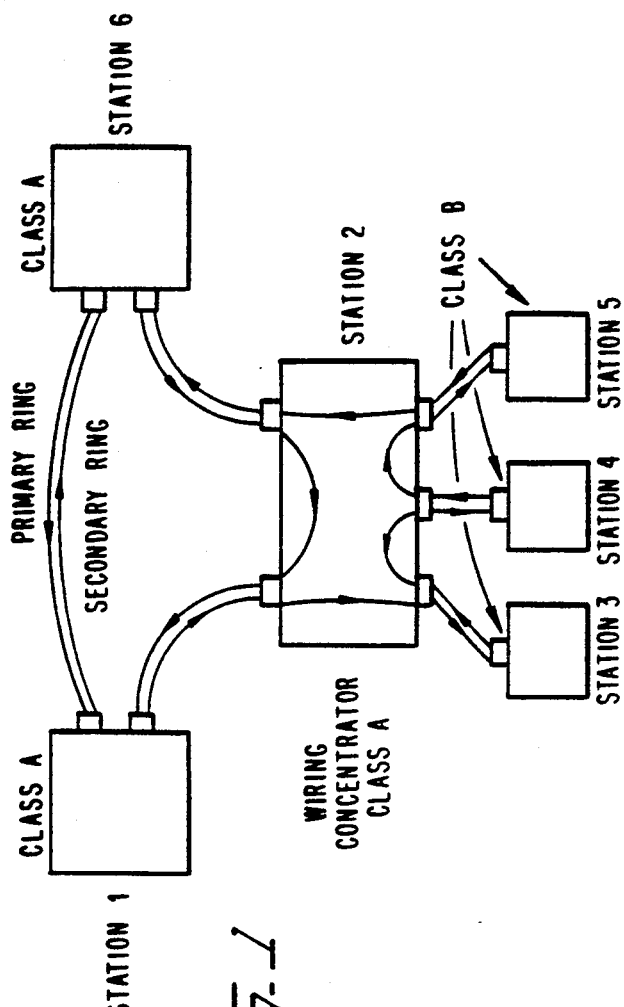
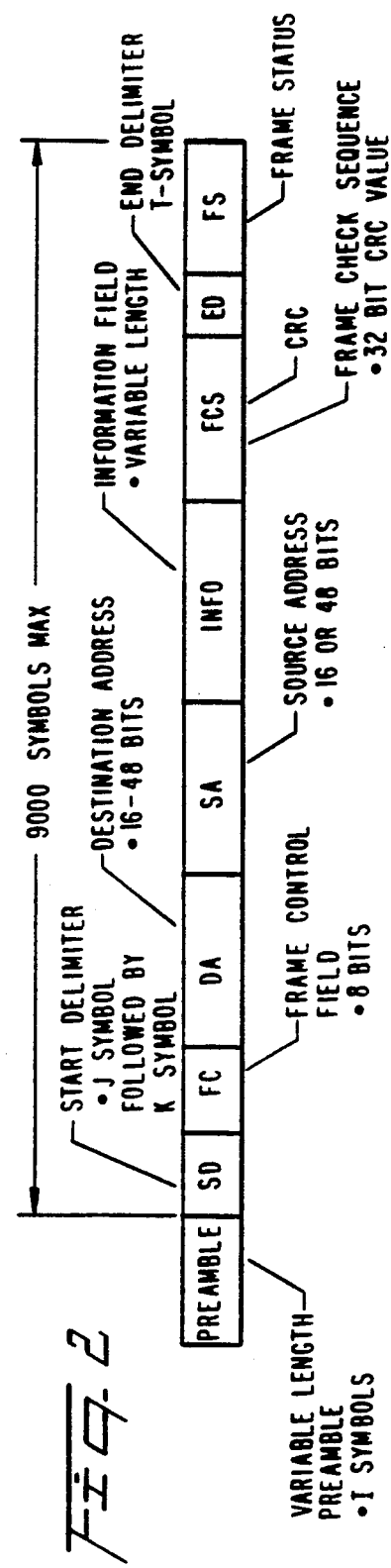

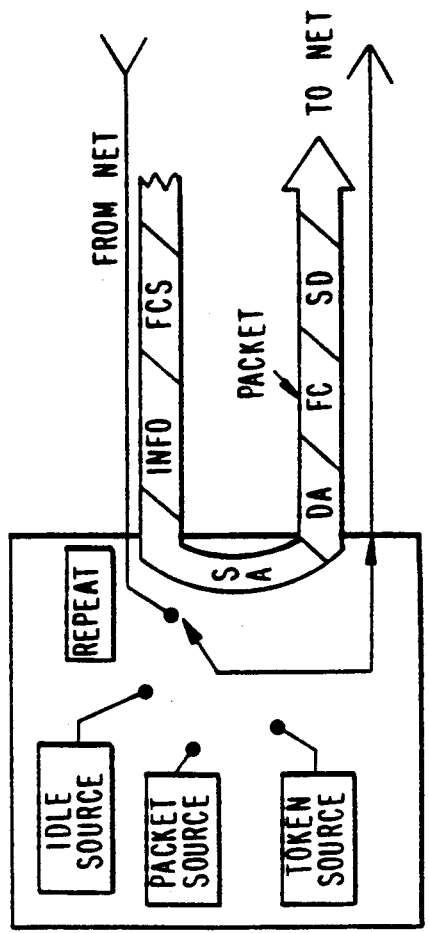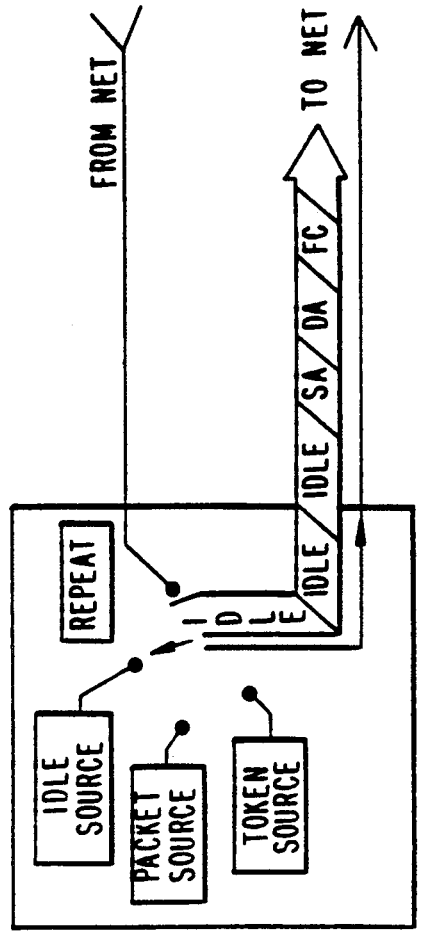
Fig. 3a
Fig. 3b

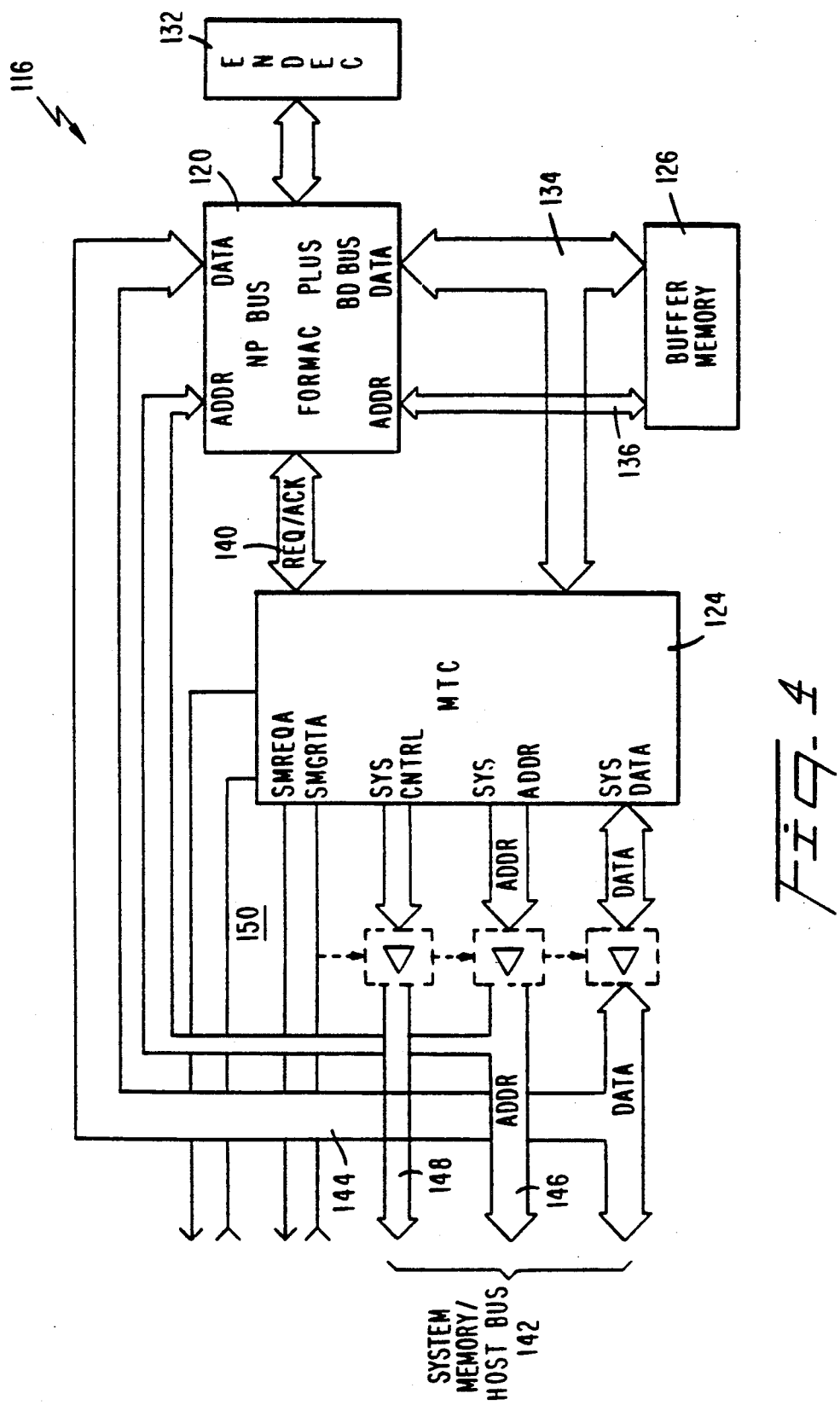

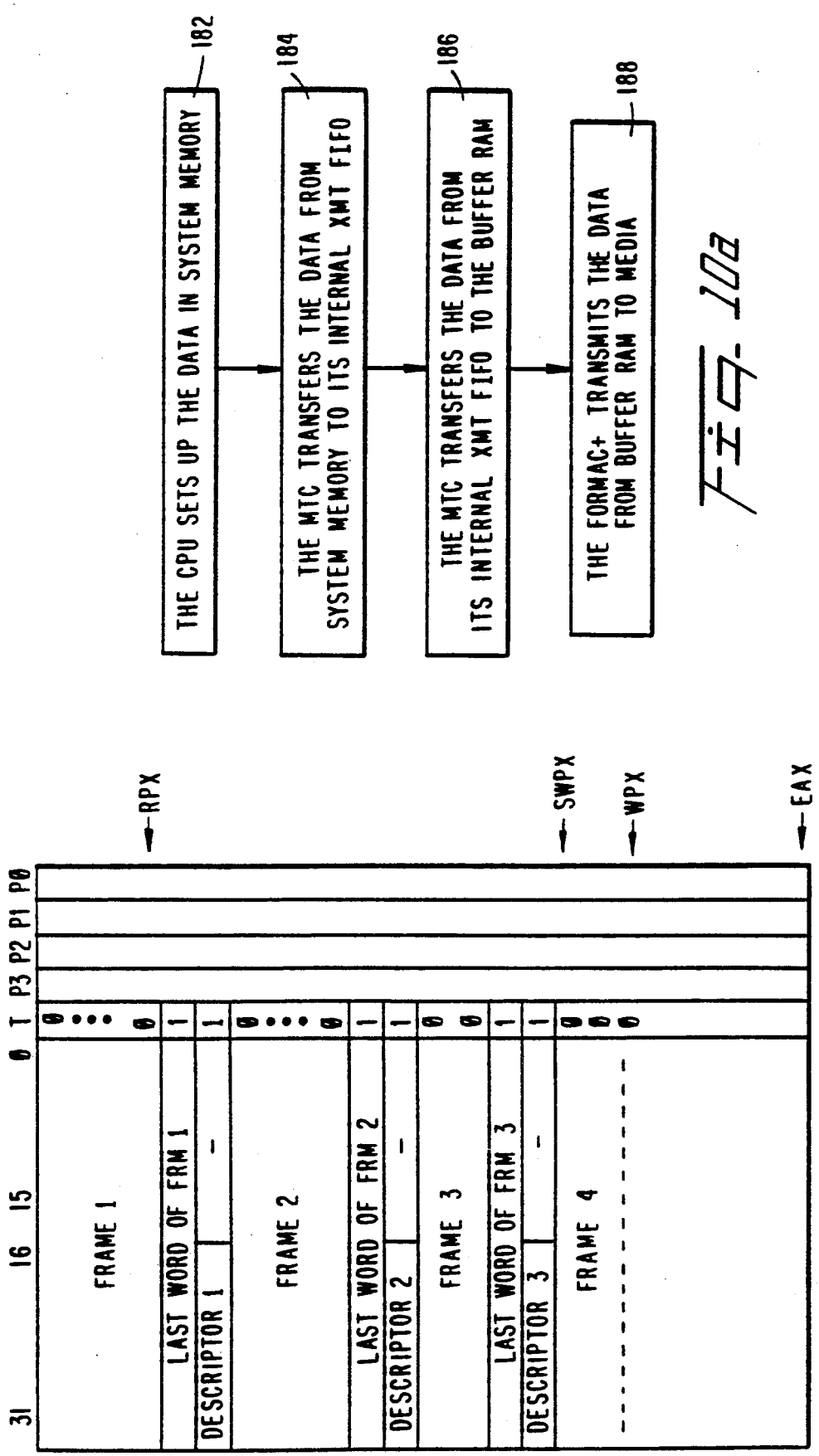

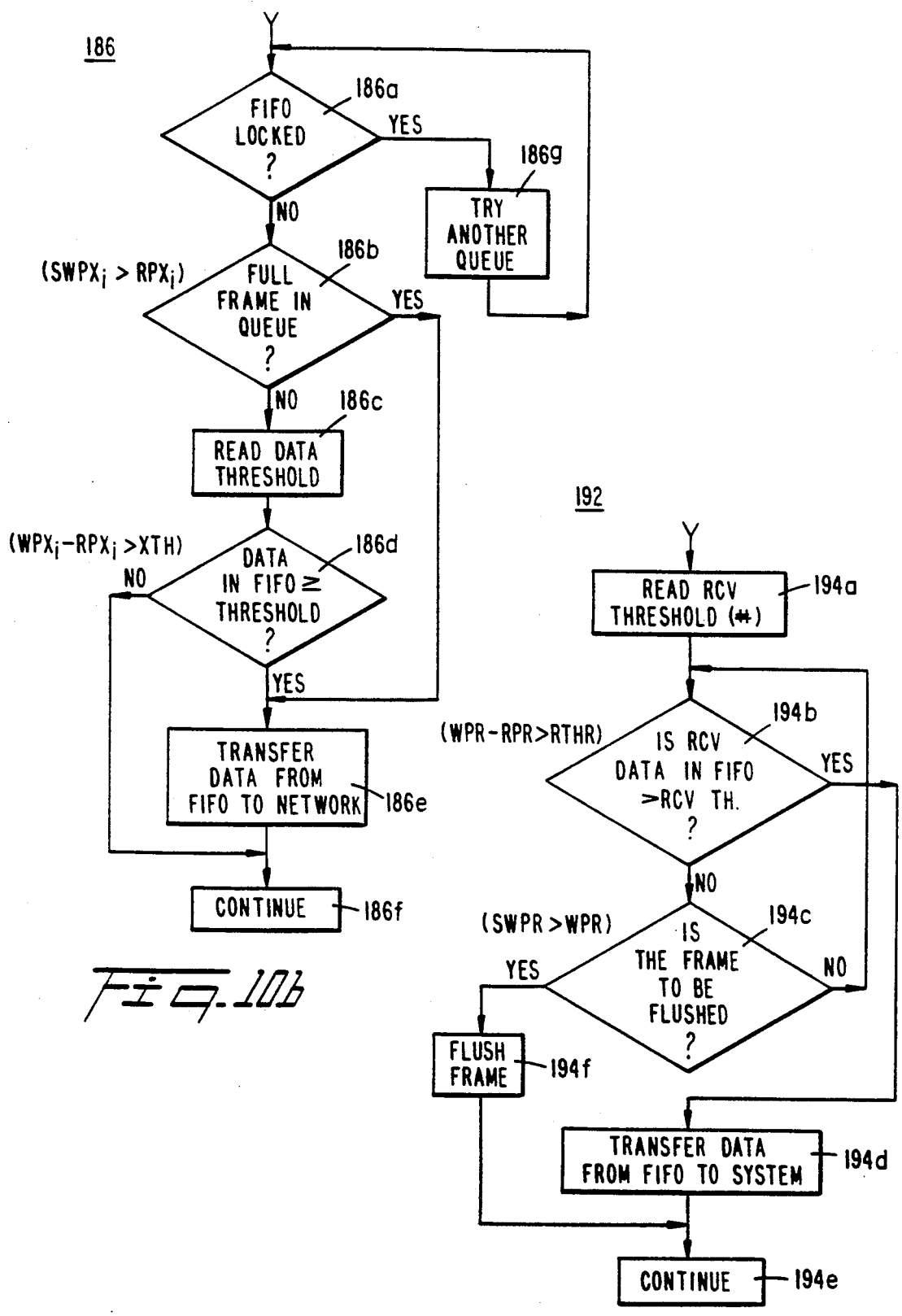

CONFIGURATION OF SRAMS AS LOGICAL FIFOS FOR TRANSMIT AND RECEIVE OF PACKET DATA

CROSS-REFERENCES TO RELATED APPLICATIONS

This application is related to the following co-pending applications, owned by the assignee of this invention, and filed on even date herewith:
1) Firoozmand, Ser. No. 07/529,364, for "FDDI CONTROLLER HAVING FLEXIBLE BUFFER MANAGEMENT",
2) Firoozmand, Ser. No. 07/529,362, for "MEMORY MANAGEMENT SYSTEM AND METHOD", now U.S. Pat. No. 5,136,582.
3) Firoozmand et al., Ser. No. 07/529,365, for "METHOD OF AND SYSTEM FOR IMPLEMENTING MULTIPLE LEVELS OF ASYNCHRONOUS PRIORITY IN FDDI NETWORKS",
4) Firoozmand, Ser. No. 07/529,366, for "METHOD OF AND SYSTEM FOR TRANSFERRING MULTIPLE PRIORITY QUEUES INTO MULTIPLE LOGICAL FIFOs USING A SINGLE PHYSICAL FIFO", now U.S. Pat. No. 5,043,981.

TECHNICAL FIELD

This invention relates generally to data manipulation, and more particularly, to a method of and system for passing data arranged in frames through the buffer of a network adapter. The invention relates particularly to increasing data throughput of a network adapter by transferring data between the system and network before a complete frame is stored in the buffer. One utilization of the invention is in Fiber Distributed Data Interface (FDDI).

BACKGROUND ART

In data manipulation systems handling packets of data arranged in frames (a packet, or burst, of data including certain framing, or "housekeeping" bits is defined as a "frame"; data sent in the form of frames is termed "framed data"), there is often a requirement to transfer frames of data between a system and another location on a network. The frames of data may be arranged in queues representing the same or different levels of priority.

An interface circuit that resides between a local system and a network is termed a "network controller". The network controller administers data flow between the system and network, including buffering the data to compensate for timing discrepancies between the system and network, providing any necessary protocol conversion and carrying out "housekeeping" by adding bits to or stripping bits from the data passing through the controller. Various types of network controller architectures are implemented based on the network operating system employed and on other considerations.

For example, in a network of a type described in copending application (1), supra, for "FDDI CONTROLLER HAVING FLEXIBLE BUFFER MANAGEMENT", incorporated herein by reference, there is a network controller comprising a bus master architecture wherein queues of framed data are transferred from buffers established in a system memory to corresponding regions formed by logical FIFOs in an output buffer for transmission to a network. Between the system memory and the output buffer is a physical FIFO having a predetermined storage capacity, e.g., 32 bytes, for storing the framed data temporarily en route to the output buffer. One purpose of the physical FIFO is to provide buffering of data that is required as a result of differences in the clock rates of system and network clocks.

The queues of data handled by the FDDI network controller are transferred from buffer regions in the system memory to the output buffer, one frame at a time, in response to a request for transmission to the network upon receipt of a "token" (in FDDI, the network is composed of an optical medium) and data available for transmission. The queues of data are stored in corresponding queues formed by "logical FIFOs" in the output buffer.

Data is transferred in order of priority beginning with the highest until no additional data having the same priority is available for transmission or the unexpired token holding time (THT) during receipt of the token has become less than a threshold value for that priority. Details on this protocol are given in copending application (3), supra, for "METHOD OF AND SYSTEM FOR IMPLEMENTING MULTIPLE LEVELS OF ASYNCHRONOUS PRIORITY IN FDDI NETWORKS", incorporated herein by reference.

Following each transfer of framed data from the system memory, through the physical FIFO, to the output buffer, a decision is made either to transfer additional data having the same priority to the physical FIFO to thereafter be transferred to the same output buffer queue, or to transfer data having a different priority to the physical FIFO, if any additional data is available, thereafter to be sent to another output buffer queue. Copending application (4) for "METHOD OF AND SYSTEM FOR TRANSFERRING MULTIPLE PRIORITY QUEUES INTO MULTIPLE LOGICAL FIFOs USING A SINGLE PHYSICAL FIFO", incorporated herein by reference, describes how to prevent "locking-up" of the FIFO. Locking-up occurs when the amount of storage remaining available in the logical FIFO containing a particular queue to be written to is less than the storage capacity of the physical FIFO. Under this condition the physical FIFO cannot unload to the logical FIFO in the buffer.

An important parameter characterizing a network controller is its rate of data throughput, or simply "throughput", which is the rate at which the controller is able to transfer data in both directions between the system and network. The throughput of the controller should be as high as possible since controller throughput usually will determine the maximum rate at which data can be transferred to the network. A second important parameter of a network controller is its latency; i.e., the time delay between the data first "given" to the network controller and the time the data "appears" on the network (or vice versa).

There are natural limitations in the throughput of a network controller. For example, the system and network clock rates will limit the rate at which data can pass through the controller. Another factor tending to limit network throughput is the amount of "housekeeping" that must be carried out on data being transferred between the system and network.

For a latency example, when data in the form of frames or packets are transferred between the system and network, through a network controller with large buffer memory, latency tends to be increased. This is because the buffer receiving a transmit data frame from the system will wait until a complete frame is received before it initiates a transfer of data to the network. The length of each frame or packet of data in a string of data may vary. It is desirable that transmit data be transferred out of the buffer as soon as enough data is received. If the frame is long, the controller should initiate transfer of data to the network upon reception of enough bytes by the buffer to prevent a condition known as "underrunning" wherein the system cannot fill the buffer so fast as to prevent the buffer from running out of transmit data. It is important not to transfer to the network less than a complete frame of transmit data because an incomplete frame will not arrive at its destination and will waste network bandwidth.

On the other hand, it is not necessary to wait until the complete frame is received by the buffer to begin to transfer data to the network. Depending on system and network latencies, it sometimes would be possible to initiate transfer of data from the buffer to the network before a complete frame is received from the system. This is because if there is a sufficient amount of transmit data in the buffer, the frame will become completed while at least a part of it is still in the buffer and while the frame is being transferred to the network. In other words, the data incoming to the buffer will "catch up" to the data previously in it before the frame is transmitted.

To maximize data throughput, the inventor has discovered that it is desirable to initiate transfer of transmit data to the network either (1) when a full frame of transmit data is received in the buffer or (2) when the buffer contains an amount of transmit data, less than a full frame, sufficient to enable the frame to become completed while the data in the buffer is being transferred to the network, whichever is less.

Upon reception of data from the network, it is not necessary to wait until a complete frame is received by the buffer because the remaining portion of the frame necessarily will arrive thereafter. Ideally, the receive data should be transferred from the buffer to the system as soon as possible upon reception of the first byte. However, some receive frames may not be accepted by the network controller. Frames may be "flushed" by the controller because the frames are not addressed to the system or because the frames are deficient in some other manner. The receive data cannot be assessed by the controller immediately upon receipt of a part of a frame. It accordingly is desirable to begin to unload receive data from the buffer only after at least a predetermined amount of data is received.

DISCLOSURE OF THE INVENTION

An object of the invention is to improve data throughput of a network controller having a buffer for storing transmit and receive data arranged in frames.

Another object of the invention is to improve throughput of framed data in a network controller having a bus master architecture.

Another object is to improve throughput of framed data in a network controller having a buffer by reading transmit data from the system to the buffer while data is being transferred from the buffer to the network.

A further object of the invention is to improve throughput of framed data in a network controller having a buffer by transferring data from the buffer to the system while data is incoming from the network.

A still further object is to improve throughput of framed data in a network controller by initiating transfer of data to the system or network in accordance with system and network bus latencies.

A still further object is to improve data handling of framed data in a network controller by initiating transfer of data from the buffer on the basis both of full frames and quantity of data received by the buffer.

Another object of the invention is to improve data throughput in an FDDI network controller by transferring data from the buffer to the network or system based both on full frames and quantity of FDDI packet data stored in logical FIFOs configured in a buffer.

Still another object of the invention is to improve data throughput in an FDDI network controller having logical FIFOs storing queues of framed data by initiating transfer of data from the FIFOs while data is being received thereto.

Another object of the invention is to improve data handling by an FDDI network controller by controlling flow of FDDI packet data arranged in queues into and from corresponding logical FIFOs based both on full frames and quantity of data stored therein.

The above and other objects of the invention are satisfied by a network adapter controlling flow of data arranged in packets from a system memory to a network. The controller comprises a buffer memory configured as logical first in-first out memories (FIFOs) for storing transmit and receive data, and a means for detecting a request for transmission of data to the network. In response to a request for transmission to the network, data is transferred from the system memory, one packet at a time, to the transmit FIFO, and then from the transmit FIFO to the network while data still is incoming from the network. This enables the FIFO to transmit to the network before a full frame is received.

In accordance with another aspect of the invention, a packet detecting means detects presence in the transmit FIFO of at least one frame of data to be transmitted to the network. Data is transferred from the transmit FIFO to the network when the frame detecting means detects the presence of a full frame of transmit data in the FIFO while data is being received from the system.

Another aspect of the invention provides a transmit data threshold detecting means for detecting presence in the transmit FIFO of at least a predetermined amount of data to be transmitted to the network. Data is transferred from the transmit FIFO to the network when the data threshold detecting means detects the presence of at least the predetermined amount of transmit data in the transmit FIFO. The predetermined amount of transmit data, selected based on system and network latencies and on other factors, is the amount of data stored in the transmit FIFO sufficient to prevent data "underrunning" during transfer of data from the FIFO to the network.

Preferably, the data threshold detecting means and frame detecting means both are incorporated in the controller so that data is transferred from the transmit FIFO to the network when either a full frame is stored in the FIFO or at least the predetermined amount of data is stored.

In accordance with a further aspect of the invention, a receive data threshold detecting means detects the presence in the receive FIFO of at least a predetermined amount of data received from the network. Data stored in the receive FIFO is transferred to the system when at least the predetermined amount of receive data is in the FIFO. The receive threshold is an amount of data sufficient to confirm that the data received is not to be flushed.

Preferably, transmit and receive data stored in the FIFOs are in the form of packets each having one end demarked by a tag bit and wherein said adapter further includes means response to the tag bit detecting the end of a packet.

In accordance with another aspect of the invention, the transmit FIFO is defined by START and END pointers and includes a READ pointer and a WRITE pointer respectively for reading data to and writing data from the FIFO. A SHADOW WRITE pointer points to the end of a full frame stored in the transmit FIFO. The transmit threshold is detected when the SHADOW WRITE pointer exceeds the READ pointer. Preferably, the transmit threshold value is read from a register compared to the difference between the READ and WRITE pointers.

A preferred embodiment of the invention is in a Fiber Distributed Data Interface (FDDI) network having a plurality of processors each having system memory means for storing frames of data arranged in a plurality of different queues. An output buffer memory of the interface is configured to have a plurality of logical first in-first out (FIFO) memory regions for storing respectively the plurality of queues of framed data to be transmitted to the medium. The framed data, stored in the logical FIFO memory regions of the output buffer memory, are transmitted to the medium.

The system is interfaced with the optical medium by accessing the optical medium upon a token capture in response to predetermined conditions. In response, framed data is transferred to the medium by (a) transmitting the framed data from the system memory means to corresponding logical FIFOs in the buffer memory, one queue at a time in order of priority, and (b) transmitting framed data stored in the logical FIFOs to the medium while data is incoming from said system memory means to the logical FIFOs. Latency into the network is decreased, in accordance with a particular aspect of the invention, by initiating transfer of transmit data from the logical FIFO to the medium as soon as either a full frame of data or at least a predetermined amount of data in the FIFO is detected.

Throughput of the interface is further increased by transferring data received in the receive FIFO while data is incoming from the medium. In accordance with this aspect of the invention, more specifically, data incoming from the medium to be stored in the system memory means is detected, and data is transferred from the medium to the receive FIFO. As soon as a predetermined amount of data stored in the receive FIFO, i.e., enough to determine whether the data is to be flushed, is detected, the data is transferred from the receive FIFO to said system memory means.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 1 is a block diagram of a typical implementation of an FDDI network of a type known in the prior art.

FIG. 2 is a diagram showing the format of an FDDI packet.

FIGS. 3(a) and 3(b) are diagrams showing operation of the MAC sublayer in FDDI specifications.

FIG. 4 is a block diagram of an implementation of the network interface, with separate node processor and host.

FIG. 9 is a diagram showing a buffer memory transmit queue.

FIG. 10(a) is a generalized flow chart showing how data to be transmitted on the network is moved from the system memory.

FIG. 10(b) is a more detailed flow chart showing how transmit data is transferred from the transmit FIFO to the network when either a full frame of data or at least a predetermined amount of data is received in the transmit FIFO.

FIG. 12(b) is a more detailed flow chart showing how receive data is transferred from the receive FIFO to the system when at least a predetermined amount of data is received in the receive FIFO.

DETAILED DISCLOSURE OF A PREFERRED EMBODIMENT

Figure 5:
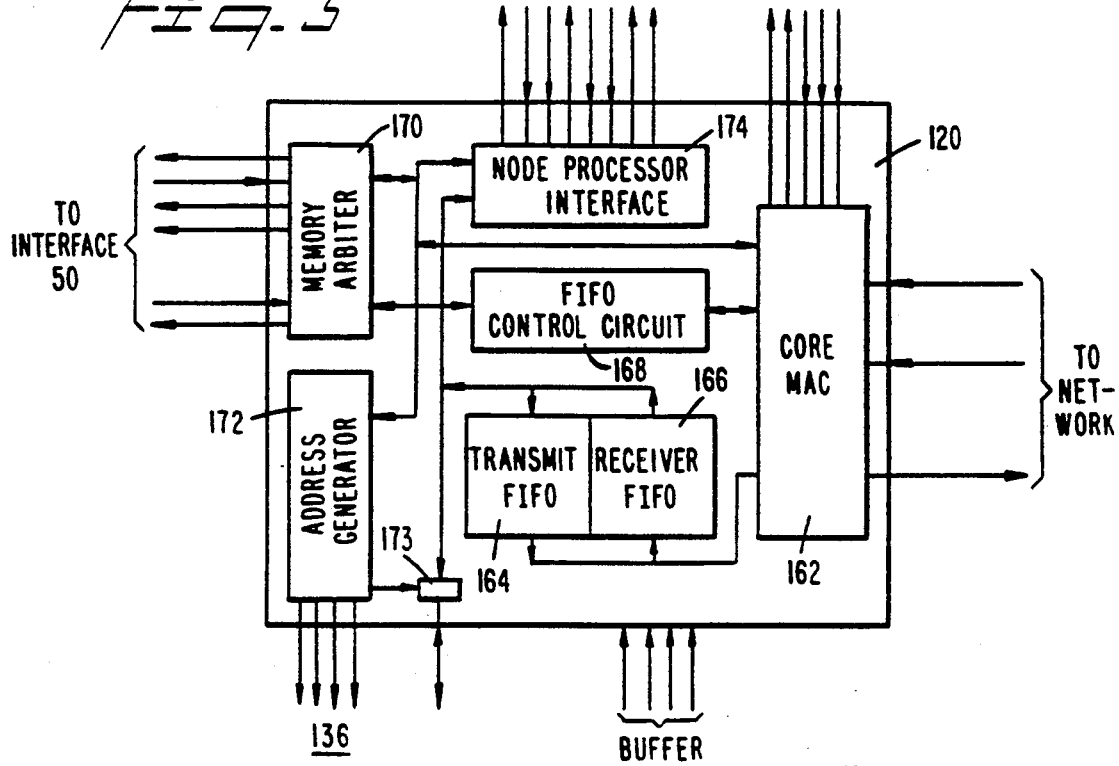
FIG. 5 is a more detailed diagram of the medium access controller shown in FIG. 4.

Although the invention has general applicability in the field of framed or packet data manipulation, a particular utilization contemplated is in an FDDI network. Accordingly, whereas the Disclosure of this invention will be made in the field of FDDI, it is to be understood that the invention is not to be so limited.

FDDI; General

Some background information on FDDI, helpful to obtain an understanding of the invention in that environment, is now provided.

"Fiber Distributed Data Interface" (FDDI), based on fiber optic components and systems, and developed by the American National Standards Institute (ANSI) X3T9.5 Committee, defines a 100 megabit per second, timed-token protocol implementing dual counter-rotating physical rings. FIG. 1 is a simplified block diagram of an FDDI ring composed of a variety of station types. Class A stations, sometimes referred to as "dual attachment stations", are connected both to the primary and secondary rings of the network. Data flows in opposite directions on the two rings, as indicated by the arrows. The Class A stations can act as a wiring concentrator, serving to connect several single-attachment, or Class B, stations to the ring. In FIG. 1, station 2 is a wiring concentrator for stations 3, 4 and 5; concentrators provide the network administrator with a single maintenance point for a large number of stations. Data transferred between stations is in the form of framed packets.

The format of an FDDI packet is shown in FIG. 2. Packets are preceded by a minimum of 16 idle control symbols (preamble). Packets begin with a start delimiter (SD) composed from the J and K control symbols of the 4B/5B code, well known in the art. This is followed by a two-data-symbol frame control (FC) field that identifies the type of packet. The destination address (DA) identifies the intended recipient of the packet. Likewise, the source address (SA) identifies the sender of the packet. Addresses can be either 26 or 48 bits in length. The DA field can point to a single station, a group of stations, or all stations on the ring.

Following SA comes the variable length information field. A frame check sequence (FCS) field contains 4 bytes of data. These data are the result of a 32 bit Autodin II cyclic redundancy check polynomial. The FCS insures data integrity of the FC, DA, SA, INFO and PCS fields.

Following the FCS field, an end delimiter (ED) formed with the T symbol is transmitted. The frame status (FS) field is used for symbols that determine whether the packet was received with error, if the address was recognized, or whether the packet was copied.

Packets are removed from the FDDI by the originating station. In this process, called "stripping" and shown in FIGS. 3(a) and 3(b), a medium access controller (MAC) 20 selects a source of IDLE control symbols for transmission on the ring. When a start delimiter arrives, the controller switches to a repeat path. The packet is monitored, copied if required, and simultaneously repeated. The medium access controller 20 also can switch to source its own packets or issue a token.

In token-passing, stations distribute the right to transmit on the medium by circulating a "token", which is a special bit pattern that assigns the right to transmit to the station that receives it. A station that wishes to transmit waits until it receives the token from the previous station in the token-passing order. When the station receives the token, it transmits its data, then passes the token to the next station.

An FDDI station waiting to transmit must first "capture" the token by performing the stripping action. Only the token SD field is repeated on the ring. Once the token is captured, the station can begin transmitting packets. When the last packet is sent, the station immediately follows by issuing a new token.

The rules for capturing the token and the amount of time allotted for data transmission are governed by "timed token protocol" defined in FDDI specifications and summarized in copending application (3), supra, and incorporated herein by reference. The protocol is designed to guarantee a maximum token rotation time (TRT), decided in a bidding process among stations during a Claim process on initialization. The bidding process allows the station requiring the fastest time between token arrivals to dictate a target token rotation time (TTRT) for the ring.

Timed token protocol offers two types of transmission service, namely, synchronous service and asynchronous service. Stations are given a predetermined amount of transmission bandwidth on each token rotation with synchronous service; the remaining ring bandwidth is shared among stations using asynchronous service. Stations are allowed to send asynchronous transmission when the token service arrives earlier than expected. The amount of time allotted for asynchronous transmission is limited to the difference between the actual time of arrival by the token and the expected token arrival time. The allotment of bandwidth for asynchronous transmission is dynamic, with any unused bandwidth for synchronous transmission being automatically reallocated for asynchronous transmission on a token rotation.

With reference to FIG. 4, in an FDDI interface of a type described in more detail in copending application (2), supra, a master bus architecture, shown generally as 116, is provided between a system, or user, bus and a network in the form of a fiber optic medium. The principal components of the bus master architecture 116 comprise a medium access controller (MAC) 120 for accessing the medium through an encoder/decoder (ENDEC) 132 that receives data frames from controller 120 and performs appropriate encoding of the frames before converting the data from parallel to serial format and carrying out other "housekeeping" functions to satisfy FDDI requirements. A network DMA (direct memory access) controller 124 controls transfer of data between at least one system memory on the system bus and an output buffer 126, configured to have at least one FIFO (first in-first out) memory, connected between the network DMA controller and the medium access controller. The medium access controller 120 implements proper network access protocol, receiving and transmitting frames of data while carrying out any required housekeeping functions such as frame stripping, error checking and bus arbitration. The network DMA controller 124 operates as a front end bus master, communicating with the host or node processor together to scatter and gather data from and among system memories and the buffer while minimizing movement of data in the memory.

The medium access controller 120, shown in FIG. 5 and described in more detail hereinafter, is interfaced to buffer memory 126 through a data bus 134 and an address bus 136, and to the network DMA controller 124 through data bus 134. Handshaking is carried out between the controllers 124 and 120 on a bus 140 to control movement of data to and from the medium.

The network DMA controller 124 resides on a host bus 142 comprising a shared data bus 144 and address and control busses 146, 148. Control signals to the network DMA controller 124 are interfaced to the host on bus request and acknowledgement lines 150. Medium access and network DMA controllers 120 and 124, together with output buffer memory 126, cooperate to carry out network interface operations on the various busses shown, as described hereinafter and in more detail in copending application (1), supra, incorporated herein by reference.

Referring to the block diagram of FIG. 6, the output buffer 126, shown in detail in FIG. 7 and described in more detail hereinafter, is configured to have a receive FIFO 175 containing a queue of data received from the medium and at least one, but preferably four, transmit FIFOs 177 each containing a queue of data to be supplied to the medium. Four queues shown in FIG. 7 represent one synchronous queue and queues containing data having three different assigned levels of priorities in accordance with FDDI specifications. The output buffer 126, which preferably is a static random access memory (SRAM), is programmed by firmware to have four FIFOs each containing a data queue of a different priority; specifically each FIFO is defined using "pointers" as described in detail hereinafter.

Data received from the medium is supplied by the network DMA controller 124 to the system memory through link list queues 178, and similarly, data is transmitted to the medium from the system memory through link list queues 180 that correspond to the synchronous and three levels of asynchronous priorities. Reference is made herein to copending application (2), supra, incorporated herein by reference, for details on buffer memory management implemented in this system.

Prior to any operation involving the output buffer 126, the node processor must load into the buffer the end addresses of all the queues. Queue pointers are in the order shown in FIG. 7, i.e., pointers define first the end of a special frame area, then a receive queue and next transmit queues in the order of sync queue followed by asynchronous queues having three levels of priority. Also programmed by the node processor are the read/write pointers of all queues used, as shown in the right hand column of FIG. 7; end address pointers are shown in the left hand column of the figure.

More specifically, each queue of the FIFO shown in FIG. 7 is characterized by an "end of address" pointer having the prefix "EA". For example, ignore the SPECIAL FRAME AREA. The SYNC queue, containing synchronous data, is characterized by an end of address pointer "EAS"; the three asynchronous queues are characterized by end of address pointers "EAA0—EAA2". Each queue furthermore is defined by READ, WRITE pointers which point to the locations from which data is read and to which data is written, in a conventional manner. The difference between the READ and WRITE pointers represents the amount of data stored in the queue. For example, in FIG. 7, RPR and RPXA0-RPXA2 represent the READ pointers for the synchronous and three levels of asynchronous data queues in accordance with FDDI standards. All of these READ pointers are at the top of the respective queues. The pointers WPXS and WPXA0-WPXA2 represent WRITE pointers for the synchronous and three levels of asynchronous data, at the ends of the respective queues.

A SHADOW WRITE pointer (SWP), in accordance with an aspect of the invention, points to the end of the frame most recently stored in a queue. Initially, when the queue is empty, the SHADOW WRITE pointer is equal to the READ and WRITE pointers, at the top of the queue. As data is written into the top of the queue, the SHADOW WRITE pointer remains equal to the READ pointer. When the end of a frame is written into the queue, detected by a "tag" bit described hereinafter in connection with FIG. 9, the SHADOW WRITE pointer updates by jumping to the end of the frame now stored in the queue. The SHADOW WRITE pointer is equal to the READ pointer if there is less than a full frame in the queue. Conversely, if at least one full frame of data is stored in the queue the SHADOW WRITE and READ pointers of a FIFO are not equal to each other.

For example, pointer SWPR in FIG. 7 is the SHADOW WRITE pointer for the RECEIVE queue. SWPXS and SWPA0-SWPA2 are the SHADOW WRITE pointers for the synchronous and asynchronous queues of transmit data. The SHADOW WRITE pointers are shown as being intermediate the READ and WRITE pointers as at least one frame of data in each queue is assumed to be stored. An empty queue (not shown) would be characterized by all three pointers for the queue being equal to each other. A non-empty queue containing less than one full frame of data is characterized by equal READ and WRITE SHADOW pointers and an unequal WRITE pointer.

As the FIFOs configured in the buffer memory 126 together forming a stack are "closed", the pointers will "wrap around" the end of the buffer and recirculate when the pointers reach the end of the FIFO stack.

These two principles, namely, (1) that the amount of data in a queue is equal to the difference between the READ and WRITE pointers, and (2) that at least one full frame of data is in the queue if the SHADOW WRITE and READ pointers are unequal, are implemented in the invention to transfer data from the buffer 126 while data is incoming to the buffer from the network or while data is being supplied to the buffer by the system. Transmit data is transferred from the buffer 126 to the network either when a full frame of data is in the buffer or when enough data is in the buffer to enable incoming data, in view of system and network bus latencies, to "catch up" to the data resident in the buffer to prevent underrunning and to complete transmit frames. Receive data is transferred from the buffer 126 to the system when sufficient data is in the buffer to enable the data either to be accepted by the system or to be "flushed" because it is not in a form able to be processed.

Because data is transferred from the buffer 126 either to the network or system "early", the data throughput of the interface is increased. This operation will be described in more detail hereinafter in connection with FIGS. 10(b) and 12(b).

How the network access and network DMA controllers 120, 124, together with buffer memory 126, cooperate to carry out network interface operations on the various buses shown, shall be described hereinafter. For the present, a more detailed description of the principal components of the interface, viz., the network DMA controller 124, medium access controller 120 and output buffer 126, will now be given.

Network DMA Controller 124

Figure 8:
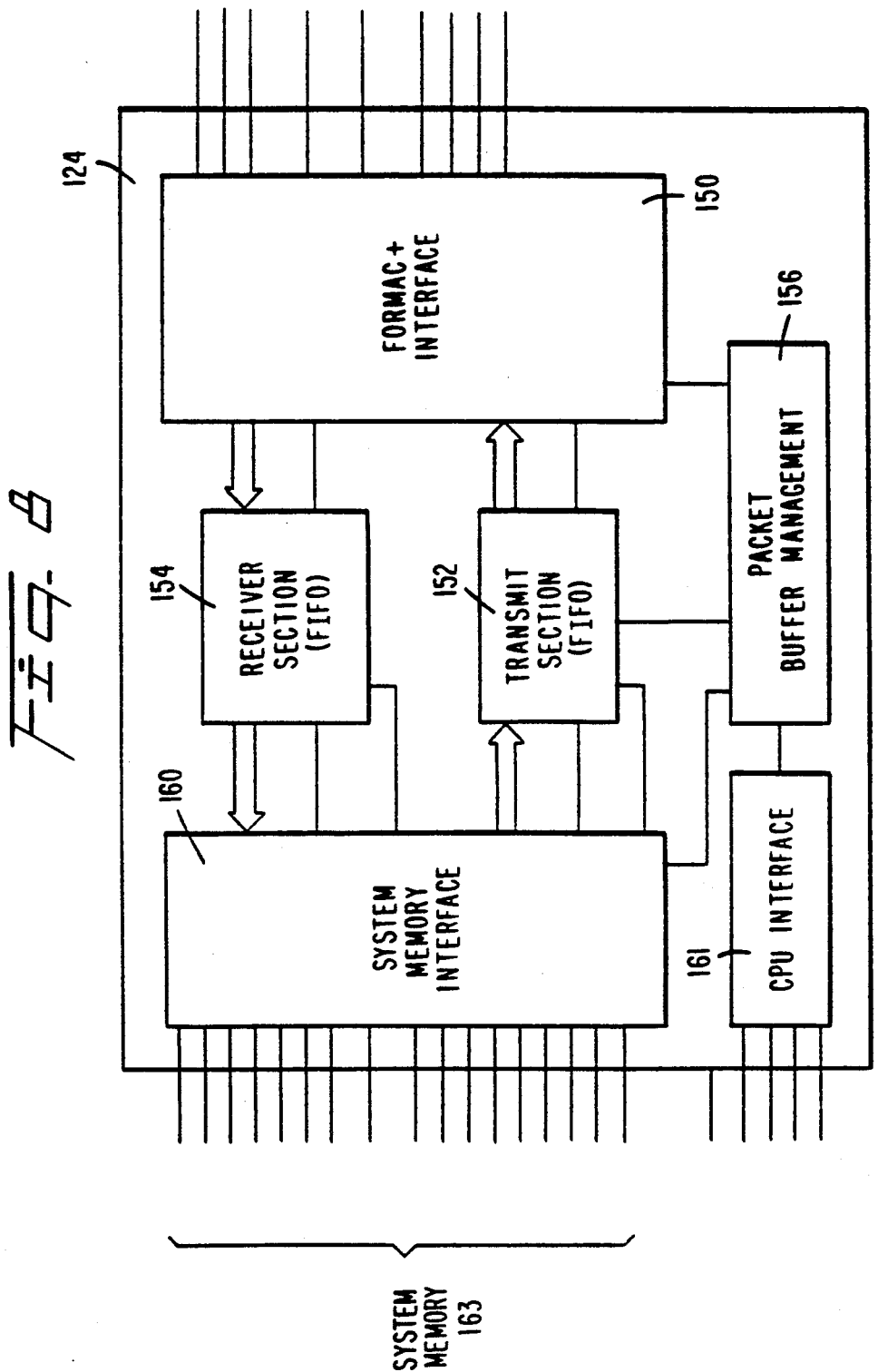
FIG. 8 is a more detailed diagram of the network DMA controller in the network interface architecture shown in FIG. 4.

The network DMA controller 124, shown in detail in FIG. 8, comprises an interface circuit 150 connected between the medium access controller 120 and the network DMA controller 124. The interface 150 communicates with a transmit section containing at least one, and preferably four, FIFOs 152, a receive section 154 containing a FIFO, and a packet buffer management circuit 156. The interface 150 transfers data stored in the transmit section 152 to the buffer memory 126 as well as transfers data from buffer 126 to receive section 154. Transfers of data from the buffer 126 to the receive section 154 are made on command by the medium access controller 120 when data on the network is available to the system and other conditions including receipt of at least a predetermined amount of receive data in the buffer are satisfied. Transfer of data from transmit section 152 are carried out when data from the system memory is available in the transmit section, the data queue therein is unlocked and other conditions including at least either a full frame or at least a predetermined amount of transmit data stored in the buffer are satisfied.

Packet buffer management circuit 156 indicates to the medium access controller 120 what type of data is present in the transmit section, so as to load the buffer memory in appropriate queues depending on the priority of data in accordance with FIFO specifications. If a queue becomes full, the interface 150 signals the packet buffer management circuit 156 to lock that queue to finish emptying the current FIFO and to suspend that queue. If a transfer is incomplete, the circuit 156 continues with other pending transfers until interface 150 signals that the queue becomes unlocked. At that time any suspended transfer is continued. If transmit and receive data are requested from the FIFOs in sections 152 and 154 at the same time, the interface 150 prioritizes these transfers based on the sequence of events in accordance with a predetermined transmit and receive priority order.

The packet buffer management circuit 156 decodes command word codes, transmits, requests clear error commands and sends appropriate information to the system memory interface 160 as well as to transmit section 152. The packet buffer management circuit 156 prioritizes command requests, transmit requests from FIFO 152 and receive requests from FIFO 154. The management circuit 156 then issues commands to a system memory interface 160 to grant either transmits or receives or to process one of the commands, and is interfaced to the system through CPU interface 161.

Transmit section 152 maintains all transmit queues and prioritizes operations in a predetermined priority. The FIFO 152 carries out byte ordering and data gathering, and formats the data into FIFO oriented packets to be processed by the medium access controller 120. Various transmit queues in the transmit section 152 are controlled, so that when the buffer memory 126 fills up a queue, queue switching is carried out. All necessary information for the locked queue is stored so that operation can be resumed when the queue becomes unlocked.

The FIFO included in the transmit section 152 is also used for data buffering and rate adaptation between system memory interface 160 and network access control interface 150. Buffering is required in the network DMA controller 138 because data transfer rates on the system memory bus and on the network are independent.

Receive section 154 receives FIFO oriented frames from output buffer memory 126 and scatters them into receive buffers in the system memory. The receive buffers are pointed to by descriptor rings. The section 154 further contains a FIFO to provide rate adaptation between the network and system memory in the same manner as the transmit FIFO 152.

System memory interface (SMI) 160 comprises a high speed programmable bus interface, address generation circuitry and storage for the system memory. The interface 160 also contains end-of-ring detection circuits for buffer management in the system memory, and a primary control state machine for the system memory interface.

Signals supplied from the system memory interface 160 at lines 163 to the system are synchronous with a system clock SCLK (not shown). These signals request access of one system memory from an external arbiter (not shown). Another signal grants the network DMA controller 124 the right to access the system memory. An address bus at the output of SMI 160 addresses all system memory accesses, and a system memory read/write line indicates whether data is being transferred from the system memory to controller 124 or from the controller to the system memory. Other signals at the output of SMI 160 indicate status of the system memory, indicate errors, and enable or disable external data buffers to prevent bus contention between reads and writes to system memory. Another SMI signal activates a latch in the SMI to latch data to the system memory for a write operation.

Signal lines at CPU interface 161 include a signal indicating that the network DMA controller 124 must read a command from memory and directing the controller to carry out the memory access. Another line signals the CPU that the network DMA controller has written a new status word in memory, and another deasserts the interrupt.

Figure 15:
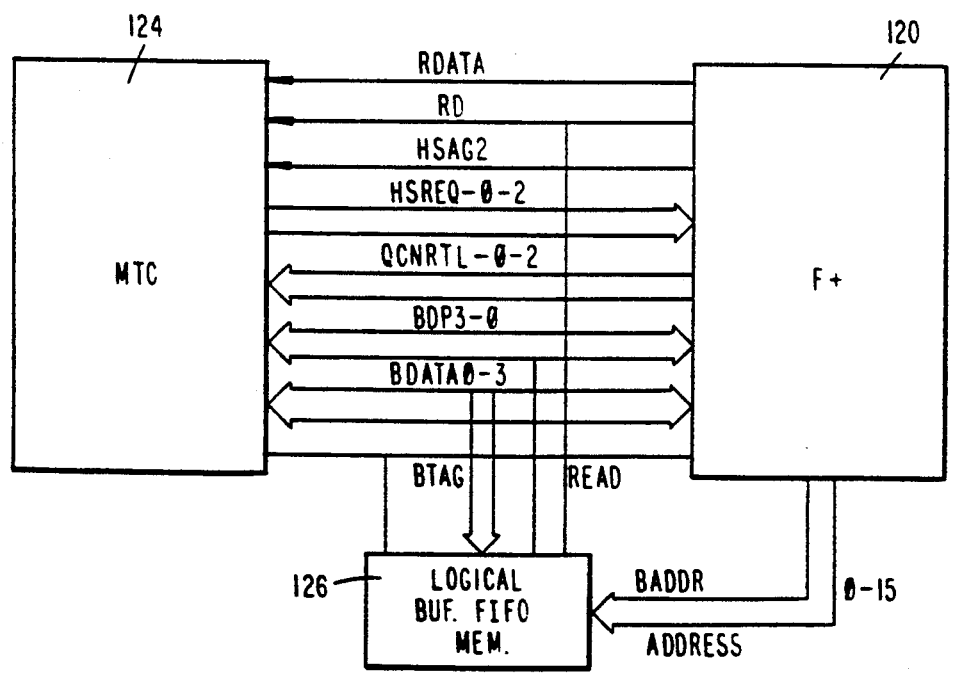
FIG. 15 is a diagram showing flow of signals among the medium access controller, the network DMA controller and the buffer memory.

At the output of the interface 150 are a host request bus that contains encoded requests to access buffer memory 126 through the medium access controller 120. Depending on the code carried on the host request bus the buffer memory 126 is accessed to read data or to write data in any of four transmit queues. The read request retrieves receive packets from the buffer 126 and stores them in system memory. Write requests transfer packets into buffer memory for transmit. Also at the output of the interface 150 is a host acknowledge line carrying a signal indicating that the present write or read request of the network DMA controller 124 is being granted by the medium access controller 120. Together with this signal, buffer memory 126 is enabled, and data is present on a data bus, data parity bus and data tag bus, to be described hereinafter (FIG. 15). The interface also provides a read output to latch data into the network DMA controller 124 when the medium access controller 120 reads data from buffer memory 126 into the DMA controller. A received data line indicates that received data is present in the buffer 126 and is ready to be transferred to the system memory. Other lines, to be described hereinafter, indicate the status of the currently accessed transmit queue in buffer 126.

Medium Access Controller 120

Medium access controller 120, shown in more detail in FIG. 5, comprises a core medium access control (MAC) 162 for handling FDDI MAC protocol. The data I/O port of MAC 162 is connected to transmit and receive FIFOs 164 and 166. Data received from the network is supplied by the receive FIFO 166 to the external buffer memory 126; data from the external buffer to be supplied to the network is stored in transmit FIFO 164. A FIFO control circuit 168 coordinates loading and unloading of the transmit and receive FIFOs 164 and 166 based on memory arbitration decisions made by a memory arbiter 170.

An address generator 172 supplies required external buffer memory addresses on address bus 136 based on the access decision of the arbiter which determines whether the network or the node processor can access the buffer memory. A node processor interface 174, whose data input is controlled by address generator 172 via gate 173, decodes instructions from the node processor, collects chip status and distributes control information throughout the controller 124.

The transmit and receive FIFOs 164 and 166, on-chip with medium access controller 120, store a number of data packets depending primarily on the latency of the system bus and burst length, in a manner similar to the transmit and receive sections 152 and 154 of the network DMA controller 124.

Buffer Memory 126

Figure 6:
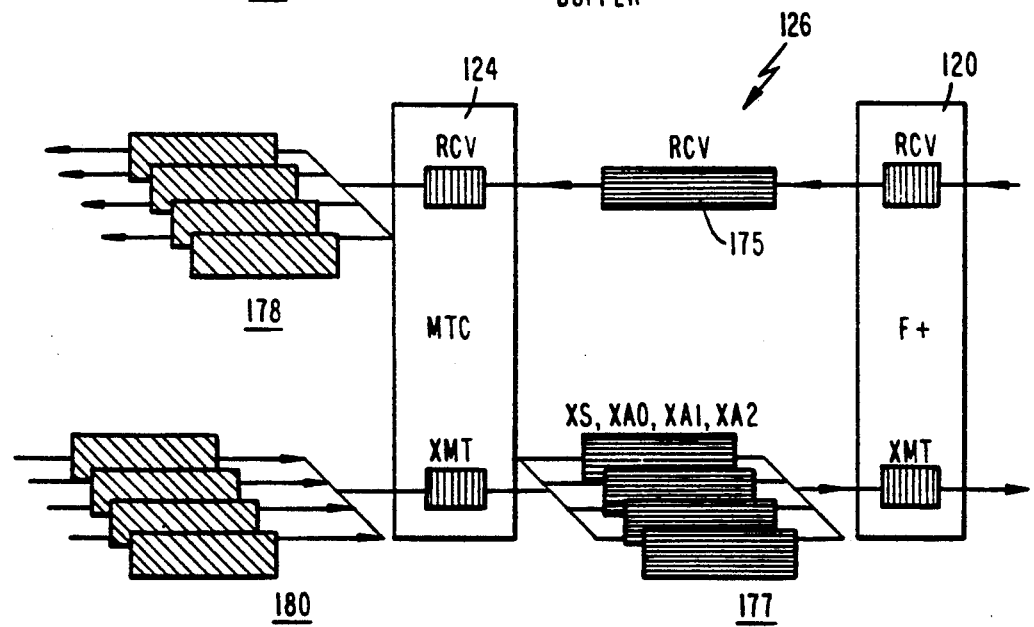
FIG. 6 is a diagram showing data flow carried out in the network interface.
Figure 7:
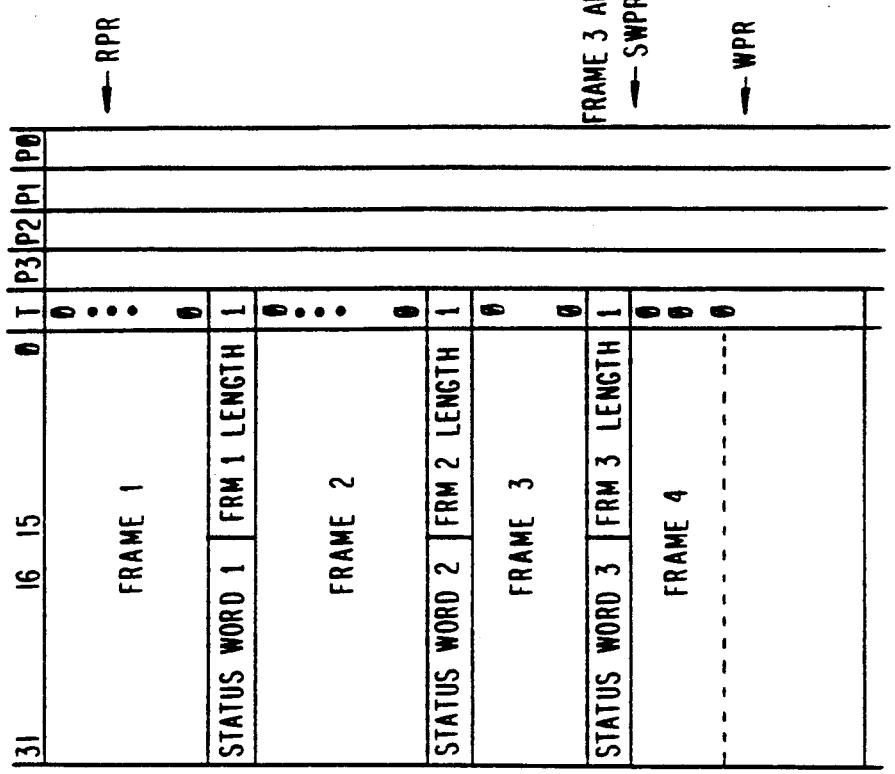
FIG. 7 is a diagram showing the organization of the buffer memory in queues implemented in the network interface.

The output buffer memory 126, shown generally in FIG. 6 and in more detail in FIG. 7, is configured to have a receive FIFO 175 containing a queue of data received from the network and at least one, but preferably four, transmit FIFOs 177 each containing a queue of data to be supplied to the network. Four queues are shown in FIG. 7, described previously, to represent one synchronous queue and queues containing three levels of asynchronous priorities of data in accordance with FDDI specifications. How the data priorities are related to each other and are supplied to the network are detailed in copending applications (3) and (4), supra, incorporated herein by reference.

The format of the transmit frames, shown in FIG. 9, consists of data at bit positions 0-31 and a tag bit and followed by a descriptor word. The last word of each frame as well as a descriptor word has the tag bit set to "1", demarking the end of the frame. Packets to be transmitted are set up in the system memory by the host or node processor. READ, SHADOW WRITE, WRITE and END OF ADDRESS pointers are positioned as shown.

Loading of Transmit Frames In Buffer Memory

The transmission procedure is shown in overview in FIG. 10. Following set-up of data in the system memory, in step 182, if the current transmit queue in output buffer 126 is determined not to be "almost full", in accordance with copending application (4), supra, the network DMA controller 124 transfers (step 184) the data from the system memory to its internal transmit FIFO 152 shown in FIG. 8. The data next is transferred from the transmit FIFO 152 to (external) output buffer memory 126 (step 186).

More specifically, the transmit frames shown in FIG. 9 are loaded by the host and network DMA controller 124 into the buffer memory 126 under control of the medium access controller 120. This is carried out in response to a request by the network DMA controller 124 to write data to the buffer 126, encoded based on the particular queue being requested. Packets preferably are loaded into the buffer 126 at the same time that the buffer is being unloaded for transmission to the network so as to maximize bus utilization efficiency and avoid overrun or underrun conditions, as described in connection with FIG. 10(b) below.

Unloading of Transmit Frames from Buffer Memory

After a frame has been loaded into the buffer memory 126, when either it has been confirmed by the medium access controller 124 that an entire frame is loaded or that the number of words of the frame written into the memory exceeds a transmit threshold, the frame is ready for transmission to the network.

When a transmission to the network is available to the system, i.e., a token on the FDDI network is captured for transmitting a queue and transmission conditions for that queue are satisfied, transmission begins and the frame is read by the medium access controller 124 until the end of the frame, characterized by a logic "1" tagbit, is encountered. At this time, frames of data are already being read into the buffer for subsequent transmission, before the buffer is emptied. That is, while transmission is in progress and after complete transmission of a frame, the medium access controller 124 fetches more data from the selected queue of the FIFO into its on-chip transmit FIFO 164 for transmission if a complete frame is in the buffer or if the content of the buffer exceeds the transmit threshold value. If neither condition is satisfied, the medium access controller 124 checks other queues, in order of priority, for transmission.

Transmission from a queue is completed when the queue is emptied. However, if the transmit FIFO 164 empties in the middle of a frame, an underrun condition is implied, and the current frame is aborted.

How transmission of data from the system to the network is carried out when at least one full frame or at least a predetermined amount of transmit data is in the buffer 126, is now described in more detail with reference to FIG. 10(b).

Figure 16:
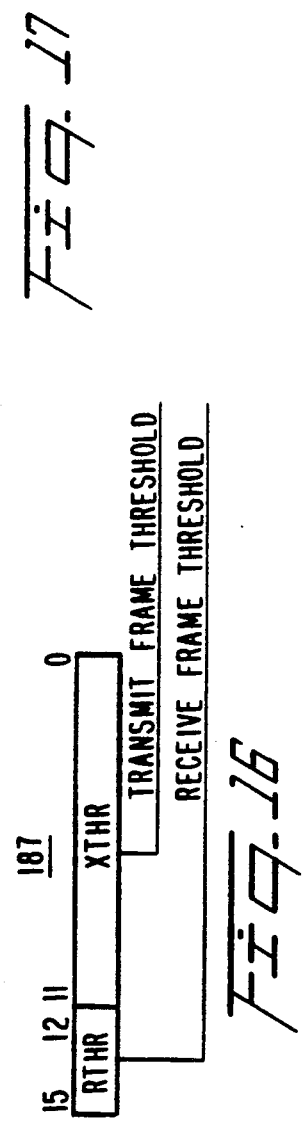
FIG. 16 is a diagram of a frame threshold register storing transmit and receive threshold values for transferring data from the transmit and receive FIFOs.

In step 186a, the queue from which data is to be transmitted first is checked to determine whether the queue is locked, as described in copending application (4). If the queue is locked, the program continues for another queue, executing step 186g. If the queue is not locked step 186b determines whether there is a full frame in the queue by testing the values of the SHADOW WRITE and READ pointers for that queue. If the two pointers are not equal to each other, the program jumps to step 186e to initiate transmission to the network because there is at least one full frame in the buffer 126. If the SHADOW WRITE and READ pointers are equal to each other, the program next tests the content of the queue to determine whether it contains at least a threshold amount of data. This is done by comparing, in step 186d, the difference between the values of the READ and WRITE pointers, representing the amount of data in the queue, with a threshold value XTHR of transmit data. The threshold value XTHR is read in step 186c from a register 187 shown in FIG. 16.

The value of the transmit threshold XTHR depends on the rate at which transmit data incoming to the buffer 126 can join with data outgoing from the buffer so as to prevent data underrunning. Data underrunning would create "void data" that must be aborted. The threshold XTHR is based on system and network bus latencies, and is inversely proportional to the rate of data transmission of the busses.

Figure 11:
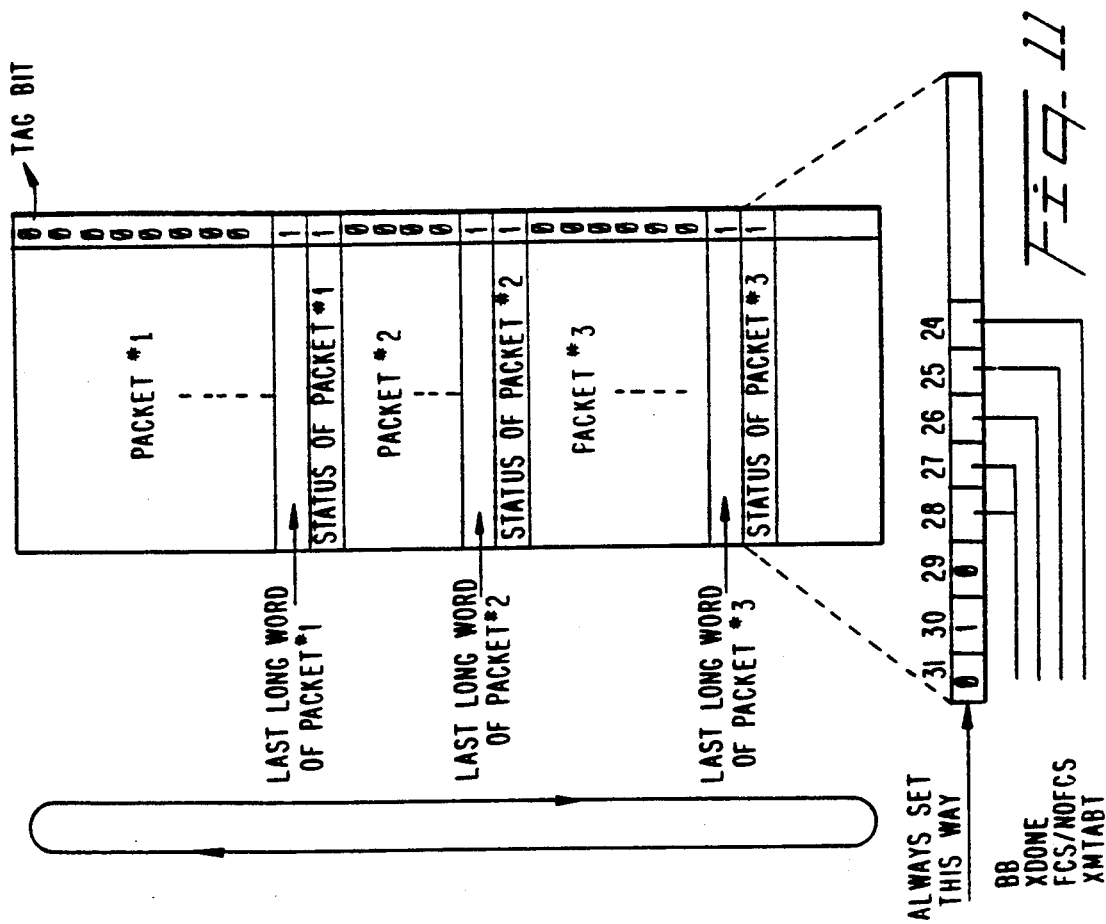
FIG. 11 is a diagram of transmit packets queued in the buffer memory.

Queues of transmit data stored in the buffer memory have the format shown in FIG. 11, wherein each frame contains long words characterized by a tag bit "0" and a last long word characterized by a tag bit "1". Following the last word of the packet is a status word also characterized by the tag bit "1". The status word reflects the status of the data buffer as well as the status of the packet including a number of predetermined bits, bits defining at which byte boundary the last word of data ends, bits copied from the status that the network DMA controller obtains from the system memory and a bit indicating whether the packet contains an error and should be aborted.

Loading of Receive Packets in Buffer Memory

Figure 12A:
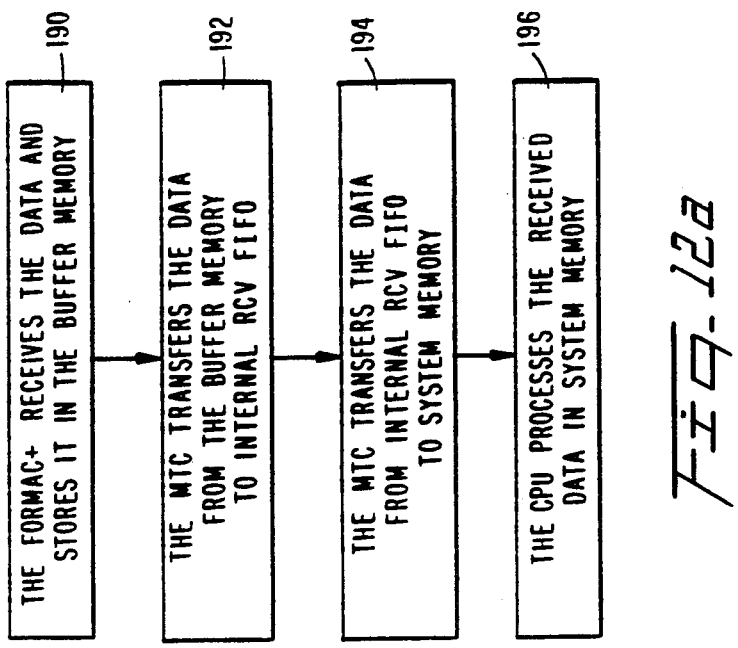
FIG. 12(a) is a generalized flow chart showing how data received from the network is moved to the system memory.
Figure 13:
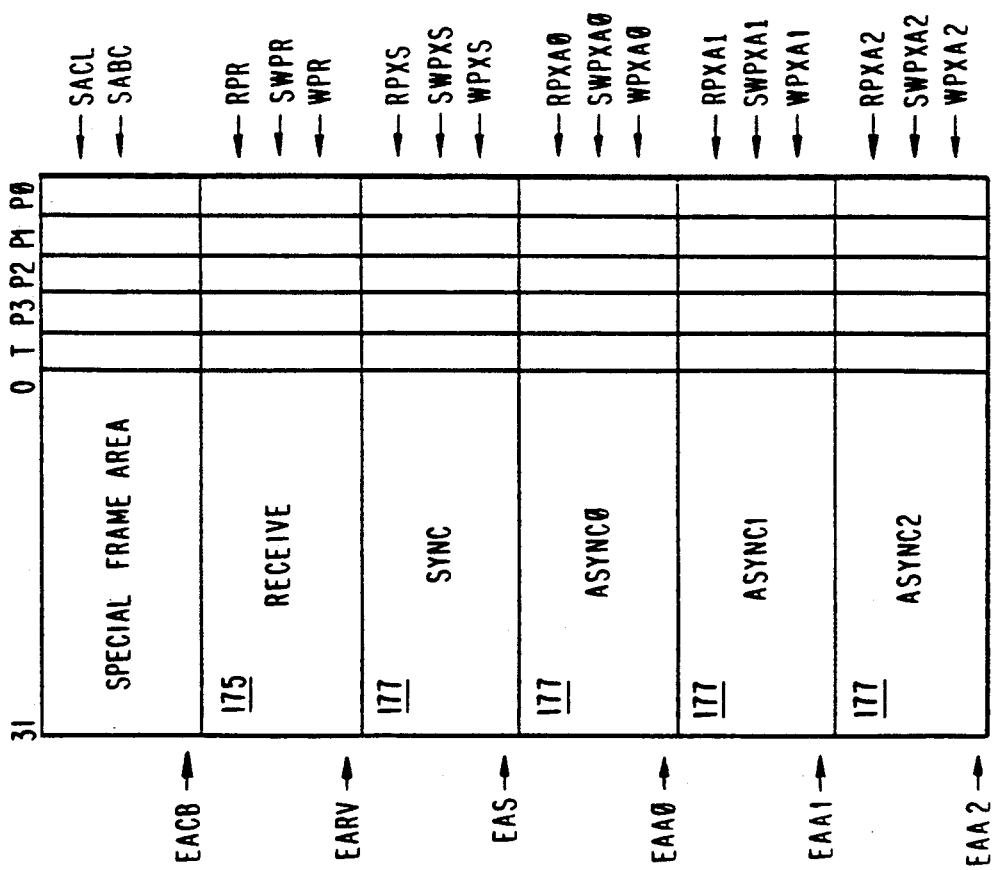
FIG. 13 is a diagram showing the structure of a buffer memory receive queue.

Reception of framed packets, shown in overview in FIG. 12(a), requires reception of data packets by the medium access controller 124 for storage in external buffer memory 126 (step 190), and transfer of the packet data from the buffer to the internal receive FIFO 154 of network DMA controller 124 (step 192). The format of receive frames stored in the buffer memory 126 is shown in FIG. 13.

Figure 14:
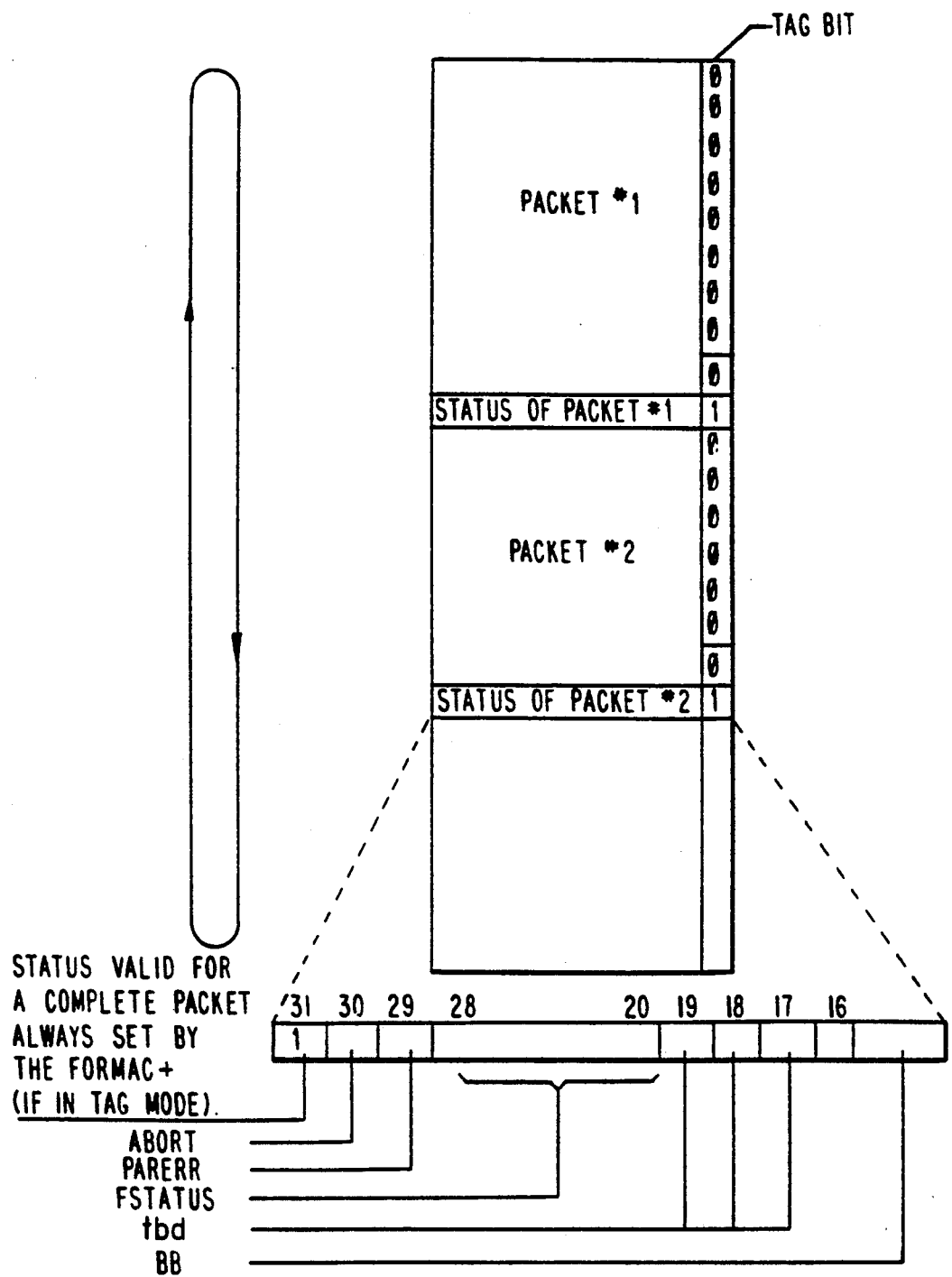
FIG. 14 shows the format of receive packets stored in the buffer memory.

Packets received from the network stored in buffer memory 126 by the medium access controller 120 are arranged in the memory in the manner shown in FIG. 14. The receive packets in the buffer memory are stored contiguously in succession, causing the buffer memory receive area to have the configuration of a circular queue. At the end of each packet, the medium access controller 120 stores the status of the packet. The tag bit is set to 0 for data and to 1 to identify the status word.

Unloading of Receive Frames from Buffer Memory

When the amount of data stored in the buffer 126 exceeds a receive threshold value, the network DMA controller 124 then transfers the packet data from the internal receive FIFO 154 to the system memory (step 194) to be processed by the host or node processor (step 196). This is controlled by the medium access controller 120 which instructs the network DMA controller 124 to transfer data from the buffer memory 126 into the system memory. This takes place when the number of words in the buffer memory exceeds a programmed receive threshold. Any overflow condition of the receive buffer queue during frame reception is indicated by the status word, indicating that the frame should be flushed.

How reception of data by the system is carried out when at least a predetermined amount of receive data is in the receive FIFO of buffer 126 is now described in more detail with reference to FIG. 12(b). Referring to step 194a, the value of a receive threshold RTHR is read from register 187 in FIG. 16. This threshold, like transmit threshold XTHR, enables the buffer 126 to begin transferring receive data to the system while data is incoming from the network. The value RTHR of the receive threshold represents the number of words received in the receive FIFO of the buffer that is sufficient, based on system and network bus latencies, to enable the interface to confirm that each frame of data receive is addressed to the system and is not otherwise to be aborted. If the number of words in the buffer 126 received from the network exceeds the value RTHR of the receive threshold, in step 194b, the program jumps to step 194d whereat receive data from the buffer is transferred to the system.

Step 194c tests the content of the receive FIFO in buffer 126 to determine whether the frame of data received in the buffer is to be flushed. This is carried out by comparing the value of the SHADOW WRITE pointer SWPR with the value of the WRITE pointer WPR. The SHADOW WRITE pointer and WRITE pointer initially are at the location of the queue where data is to be written. When a frame is written into the queue, only the WRITE pointer increments. If the receive frame is to be flushed, either because it does not contain the address of the system or because it is defective, the WRITE pointer resets back to the SHADOW WRITE pointer so that the frame is "flushed" (step 194f) from the buffer. Hence, step 194c transfers the receive data to the system if the receive data exceeds the receive threshold unless the frame is to be flushed.

Network Access and Network DMA Controller Interfacing

FIG. 15 shows the signal flow paths among medium access controller 120, network DMA controller 124 and buffer memory 126. A buffer data bus BDATA, connected between medium access controller 120 and network DMA controller 124 as well as to buffer 126 preferably is a 32 bit bus, and an additional line BTAG carries the tag bit defining whether the BD bus contains frame data or frame status at the end of frame. The bus BDP carries buffer memory data parity bits for the BD bus and the BDTAG bus. All three of these buses, namely, BDATA, BTAG and BDP, are applied to buffer memory 126. Also applied to buffer memory 126 is an address bus BADDR that carries an address applied by the medium access controller 120, which preferably is a 16 bit address.

Signals required for transmitting to the network are supplied in any of a number of different queues, depending on priority as described in copending application (3) supra, determined by the data on a control bus QCNTRL. The control bus QCNTRL also indicates to the network DMA controller 124 that a queue that was previously full now is ready to accept additional data.

Also carried by the QCNTRL bus is data indicating transfer condition of data to any one of the queues, viz, the sync queue and the three levels of asynchronous queues, to transfer data to the medium. The transfer conditions provided by the medium access controller 120 informs the network DMA controller 124 that controller 120 has the token and currently is transmitting that particular queue from buffer memory 126 to the medium.

A bus HSACK (host acknowledge) carries a signal indicating that a present network DMA controller write or read request is being granted by the medium access controller 120. Together with this signal, buffer memory 126 is enabled, and data is present on BD (bus data), BDP (bus data priority) and BDTAG buses.

RDATA is asserted when the medium access controller 120 has stored received data from the network into the buffer memory, to be transferred by the network DMA controller 124 to the system memory. In response, the network DMA controller requests access to the bus, which is acknowledged by the medium access controller 120. The medium access controller 120 stores network data in buffer memory 126 at the address specified by data on the BADDR bus, and the data stored in buffer thereafter is transferred to the network DMA controller 124, in response to an assertion by the medium access controller 120 of the READ terminal of the buffer.

Figure 19:
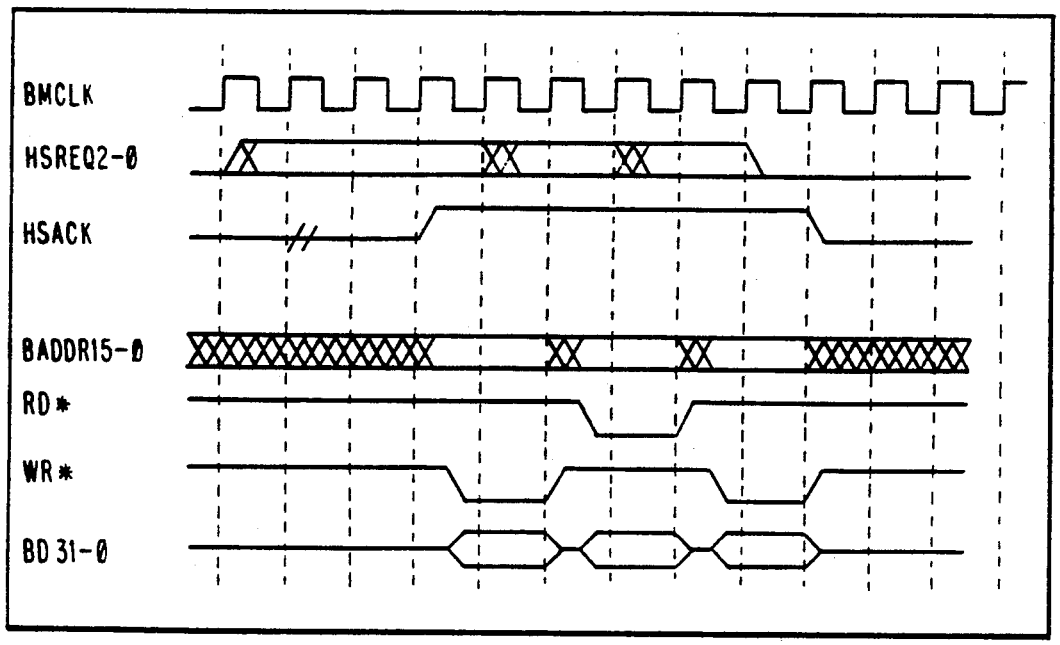
FIG. 19 is a timing diagram showing back-to-back read and write by the buffer memory.
Figure 17:
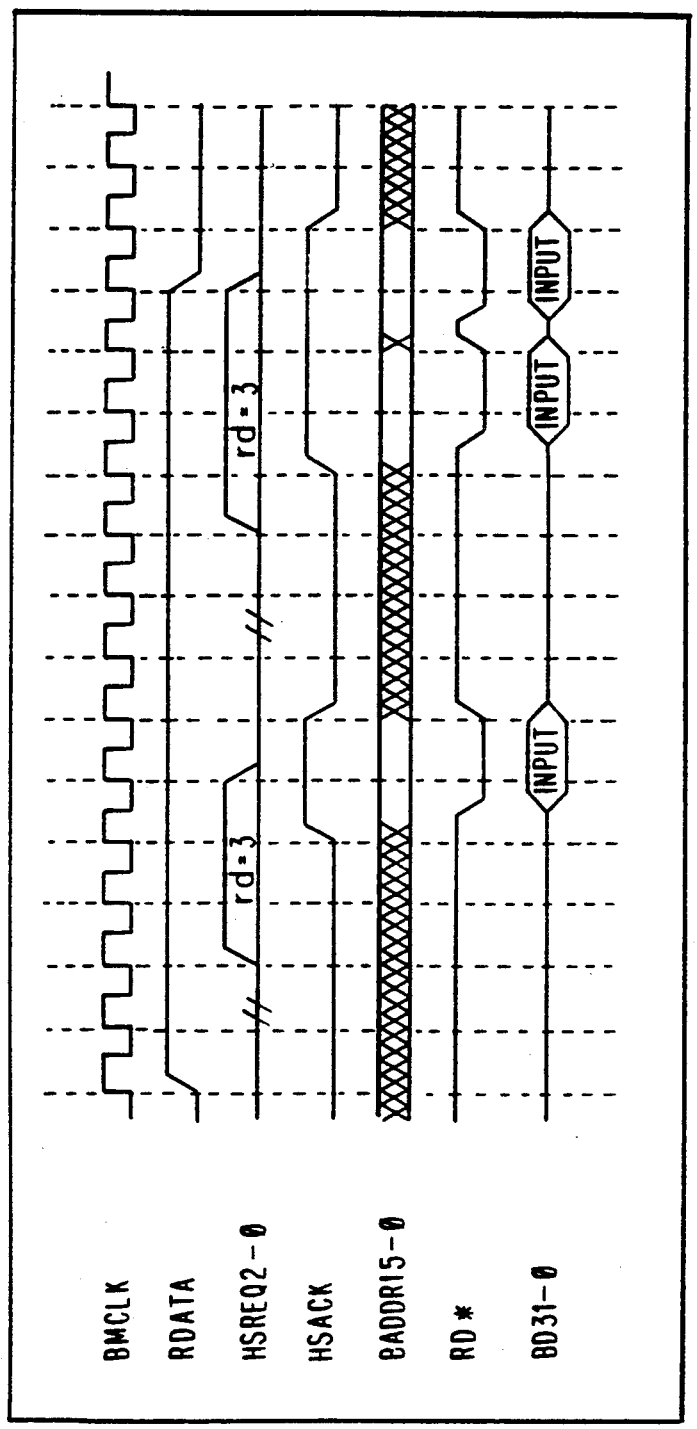
FIG. 17 is a signal timing diagram showing unloading receive frames by the buffer memory.
Figure 18:
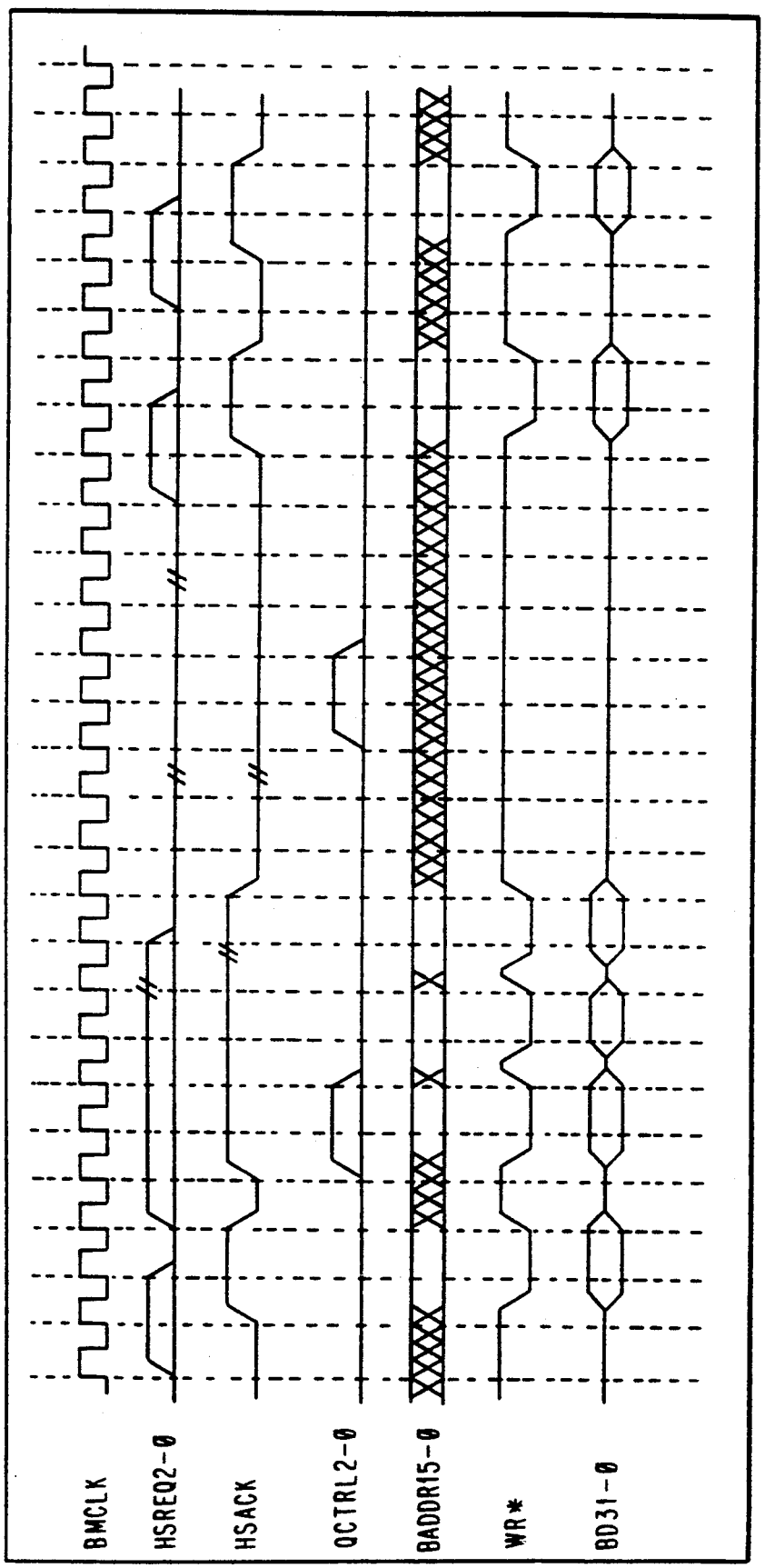
FIG. 18 is a signal timing diagram showing loading transmit frames in the buffer memory.

Handshaking between the network DMA controller 124 and medium access controller 120 carried out on the host request bus HSREQ, is shown in FIG. 15 and in the timing diagrams of FIGS. 17-19. Referring to FIGS. 15 and 17, timing of signals on the buses interfacing the network access controller 120, network DMA controller 124 and buffer 126 are synchronized to a buffer memory clock BMCLK signal shown therein, and RDATA is asserted to indicate that receive data in buffer memory 126 is ready to be read by the network DMA controller 124. In response to RDATA, the network DMA controller 124 carries out a host request on the host request bus HSREQ, with the proper code, to request to the network access controller 120 to read data frames from the network. The network access controller 120 arbitrates the bus of the buffer memory 126 and provides an acknowledgement on HSACK. The network access controller also addresses buffer memory 126, pointing to the location where data resides, asserts a read command to the buffer and latches data from the buffer, on BDATA, to the memory DMA controller 124.

Thus, the network access controller 120 stores network data in frames into buffer memory 126, and when the amount of data therein exceeds the receive threshold RTHR, the controller 120 asserts RDATA to cause the network DMA controller 124 to fetch descriptors from the system memory to determine where in the system memory the network data is to be stored. When the buffer in the system memory, pointed to by the descriptor, becomes available, the DMA controller 124 supplies a host acknowledgement HSACK to the network access controller 120. The network access controller 120, in response, arbitrates, since it may already be occupied transmitting data to the network, or carrying out other functions. If the network access controller 120 is available, it supplies an acknowledgement (HSACK) back to the DMA controller 124, and then outputs a storage address, followed by a read command, to buffer 126. The data addressed in the buffer 126 is written to BDATA and is latched in the network DMA controller 124 to be supplied to the designated buffer in system memory, to complete the handshaking necessary for receiving data from the network.

Referring to FIG. 18, the data to be transmitted currently is stored in the on-chip FIFO 152, in FIG. 8, and is ready to transfer that data to the logical FIFO in buffer memory 126. In response to a request to transmit data to the network, the network DMA controller supplies a host request signal HSREQ to the network access controller 120, indicating that the host requests a write to the network. The particular queue to which the host will write is determined by the code on the HSREQ bus. In the present example, it is assumed that the host requests to write to the sync queue, so that sync frames of data are supplied to the network. In response, the network access controller 120 arbitrates, and when time is available, it is responds with an acknowledgement signal to the host (HSACK). The network access controller 120 also supplies to buffer memory 126 the address therein where the frames of data to be transmitted to the network are temporarily stored, and supplies to a write pulse to the buffer. Data supplied by the network DMA controller 124 on the BDATA bus accordingly is written into the logical FIFO formed in buffer memory 126 at the location specified by the network access controller 120 on BDADDR.

If no more data is to be transmitted to the network, the network DMA controller 124 provides no further requests on HSREQ to the network access controller 120. If additional data is to be transmitted to the network, on the other hand, the HSREQ bus remains asserted, and when the network access controller 120 arbitrates that time is available, it supplies an additional address and write pulse to the buffer 126 after acknowledging to the controller 124 on HSACK.

FIG. 19 shows the timing relationships of data on the buses during back-to-back read and write operations. In the example shown, the network access controller 120 initially is busy carrying out a write, then carries out a read operation and then returns to a write operation. The signals supplied to the various buses involved correspond in succession to those shown in FIGS. 17 and 18.

Conclusion

By detecting the amount of receive and transmit data in buffer 126, and unloading the transmit data to the network and receive data to the system memory while data is incoming to the buffer, the data throughput of the interface is improved. Transmit data is sent from the buffer to the network when the amount of transmit data in the buffer exceeds a transmit threshold value, read from a register or when at least one full frame of data is in the buffer. The transmit threshold is a number of words, determined in accordance with system and bus latencies and other factors, that when stored in the buffer will enable incoming data to "catch up" to avoid underrunning. Receive data is transferred from the buffer to the system memory as soon as the amount of receive data in the buffer exceeds a receive threshold read from the register.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, although the invention is described in the environment of FDDI, it is not to be so limited.

What is claimed is:

1. For a network adapter controlling flow of data arranged in packets from a system memory to a network, comprising:
   buffer memory means for storing data in the form of the packets each having one end marked by a tag bit;
   means for configuring said buffer memory means as a logical first in-first out memory (FIFO);
   means for detecting a request for transmission of data to the network;
   first means responsive to said request for transmission to said network for transferring data from said system memory, one packet at a time, to said FIFO;
   means responsive to said tag bit detecting the end of a packet; and
   second means responsive to said tag bit detecting means for transferring said data from said FIFO to said network while data is incoming from the system memory to said FIFO.

2. The adapter of claim 1, including packet detecting means for detecting the presence in said FIFO of at least one packet of said data to be transmitted to the network, and wherein said second means includes means responsive to said packet detecting means for transferring said data in said FIFO to said network.

3. The adapter of claim 1, including transmit data threshold detecting means for detecting the presence in said FIFO of at least a predetermined amount of data to be transmitted to said network, and wherein said second means includes means responsive to said transmit data threshold detecting means for transferring said data in said FIFO to said network.

4. The adapter of claim 3, including packet detecting means for detecting the presence in said FIFO of at least one packet of said data, and wherein said second means includes means responsive to said packet detecting means and said transmit data threshold detecting means for transferring said data to said network when either at least a packet of data or at least the predetermined amount of data is in said FIFO.

5. The adapter of claim 1, including receive data threshold detecting means for detecting the presence in said FIFO of at least a predetermined amount of data received from the network, and wherein said second means includes means responsive to said receive data threshold detecting means for transferring said data in said FIFO to said system memory means.

6. The adapter of claim 3, wherein said FIFO is defined by START and END pointers and including a READ pointer and a WRITE pointer respectively for reading data to and writing data from said FIFO and a SHADOW WRITE pointer pointing to the end of a full frame stored in said FIFO, wherein said transmit data threshold detecting means includes means for detecting when said SHADOW WRITE pointer exceeds said READ pointer.

7. The adapter of claim 6, including a register storing a data threshold value wherein said transmit data threshold detecting means includes means for comparing the difference between said READ pointer and said WRITE pointer with said data threshold value.

8. The adapter of claim 3, including a register storing a data threshold value, and wherein said transmit data threshold detecting means includes means for comparing the content of said FIFO and said data threshold value.

9. For a network adapter controlling flow of data arranged in packets between a system memory and a network, comprising:
 first memory means for storing transmit data;
 means for configuring said first memory means as a first logical first in-first out memory (transmit FIFO);
 means for detecting a request for transmission of data to the network;
 first means responsive to said request for transmission to said network for transferring data from said system memory, one packet at a time, to said transmit FIFO;
 second means for transferring said data from said transmit FIFO to said network while said transmit FIFO is receiving data from said system memory;
 second memory means for storing receive data;
 means for configuring said second memory means as a second logical first in-first out memory (receive FIFO);
 means for detecting data incoming from the network to be stored in the system memory;
 third means for transferring data from said network to said receive FIFO; and
 fourth means detecting a predetermined amount of data in said receive FIFO for transferring said predetermined amount of data from said receive FIFO to said system memory while said receive FIFO is receiving data from said network.

10. The adapter of claim 9, wherein data stored in said FIFO is in the form of packets each having one end demarked by a tag bit and wherein said adapter further includes means response to said tag bit detecting the end of a packet.

11. For a network adapter controlling flow of data arranged in packets between a system memory and a network, apparatus comprising:
 first buffer memory means for storing data to be transmitted on said network;
 means for configuring said first buffer memory means as a first logical first in-first out memory (transmit FIFO);
 first detecting means for detecting a request for transmission of data to the network;
 means responsive to said first detecting means for transferring data from said system memory, one packet at a time, to said transmit FIFO;
 second detecting means for detecting the presence in said transmit FIFO of at least one full packet of said transmit data;
 third detecting means for detecting the presence in said transmit FIFO of at least a predetermined amount of transmit data;
 means responsive to said second and third detecting means for transferring data from said transmit FIFO to said network when either at least a full packet of data or at least said predetermined amount of data is stored in said transmit FIFO;
 second memory means for storing data received from said network;
 means for configuring said second memory means as a second logical first in-first out memory (receive FIFO);
 fourth detecting means for detecting data incoming from the network to be stored in the system memory;
 means for transferring data from said network to said receive FIFO;
 fifth detecting means for detecting a predetermined amount of data stored in said receive FIFO from said network; and
 means responsive to said fifth detecting means for transferring said predetermined amount of data from said receive FIFO to said system memory.

12. The apparatus of claim 11, wherein said transmit FIFO is defined by START and END pointers and including a READ pointer and a WRITE pointer respectively for reading data to and writing data from said transmit FIFO, and a SHADOW WRITE pointer pointing to the end of a full frame stored in said transmit FIFO, wherein said second detecting means includes means for detecting when said SHADOW WRITE pointer exceeds said READ pointer.

13. The apparatus of claim 12, including a register storing a data threshold value, and wherein said third detecting means includes means for comparing the difference between said READ pointer and said WRITE pointer with said data threshold value.

14. The apparatus of claim 11, including a register storing a data threshold value, and wherein said third detecting means includes means for comparing the content of said transmit FIFO and said data threshold value.

15. For a network adapter including at least one processor and system memory means for storing packets of data arranged in frames having at least data bits and an end of packet bit, a network controller, comprising:
 a random access memory;

means for defining in said random access memory a buffer memory configured as a transmit FIFO;

means for transferring from said system memory means to said transmit FIFO successive frames of data demarked by said end of packet (tag) bits and forming a queue to be transmitted;

first detector means for detecting said tag bits to determine that at least one full frame of data is stored in said transmit FIFO;

second detector means for detecting that at least a predetermined amount of data is stored in said transmit FIFO; and means responsive to at least one of said first and second detector means for transmitting the content of said transmit FIFO to a network.

16. The controller of claim 15, wherein said transferring means includes first means for transferring frames of data to said transmit FIFO while said transmit FIFO is transmitting to said network.

17. The controller of claim 15, wherein said transmit FIFO is defined by START and END pointers and including a READ pointer and a WRITE pointer respectively for reading data to and writing data from said transmit FIFO, and a SHADOW WRITE pointer pointing to the end of a full frame stored in said transmit FIFO, wherein said first detector means includes means for detecting when said SHADOW WRITE pointer exceeds said READ pointer.

18. The controller of claim 17, wherein said second detector means includes means for comparing the difference between said READ pointer and said WRITE pointer with said data threshold value.

19. The controller of claim 15, including a register storing a data threshold value, and wherein said second detector means includes means for comparing the content of said transmit FIFO and said data threshold value.

20. For a network adapter including at least one processor and system memory means for storing packets of data arranged in frames having at least data bits and an end of packet bit, a network controller, comprising:

a random access memory;

means for defining in said random access memory a buffer memory configured as a receive FIFO;

means for storing in said receive FIFO incoming receive data packets demarked by said end of packet (tag) bits and forming a receive queue;

means for storing a receive data threshold value;

means for detecting that the content of said receive FIFO exceeds said receive data threshold value; and means responsive to said detecting means for transferring data from said receive FIFO to said system memory means.

21. The controller of claim 20, wherein said receive FIFO is defined by START and END pointers, and including READ and WRITE pointers, a SHADOW WRITE pointer pointing to the beginning of the latest frame being received in the receive FIFO, and a receive threshold value, wherein said receive data is transferred to said system memory means when said write pointer exceed said threshold value and when said receive data is to be flushed, the write pointer is replaced by the shadow write pointer.

22. A method of controlling flow of data arranged in packets each having one end marked by a tag bit between a system memory and a network bus, comprising the steps of:

configuring a first memory as a first logical first in-first out memory (transmit FIFO);

detecting a request for transmission of data to the network bus;

in response to a request for transmission to said network bus, transferring data from said system memory, one packet at a time, to said transmit FIFO;

detecting the tag bit defining the end of a packet; and in response to occurrence of the tag bit transferring said data from said transmit FIFO to said network bus while data is incoming from said system memory to said transmit FIFO.

23. The method of claim 22, including the additional steps of detecting the presence in said transmit FIFO of at least one full packet of said data, and in response, transferring said data to said network bus.

24. The method of claim 22, including the additional steps of detecting the presence in said transmit FIFO of at least a predetermined amount of data, and in response, transferring said data to said network bus.

25. The method of claim 24, including the additional steps of detecting the presence in said transmit FIFO of at least a predetermined amount of data, and in response, transferring said data to said network bus when either at least a packet of said data or at least the predetermined amount of data is stored in the transmit FIFO.

26. The method of claim 22, including the additional steps of configuring a second memory as a second logical first in-first out memory (receive FIFO);

detecting data incoming from said network bus to be stored in said system memory;

transferring data from said network bus to said receive FIFO;

detecting a predetermined amount of data stored in said receive FIFO from said network bus; and in response, transferring said data from said receive FIFO to said system memory.

27. For an adapter for a network including a plurality of processors and system memory means for storing frames of data arranged in a plurality of different queues, the frames of each queue having a priority different from the priorities of frames of data of the other queues, apparatus for controlling transmission of said frames of data between said system memory means and said network, comprising:

a buffer memory configured to have a plurality of separate logical first in-first out (FIFO) memory regions for storing respectively the plurality of queues of framed data to be transmitted to or received from the network, each of said FIFO memory regions storing one of said queues;

first data controller means for controlling flow of said framed data, one queue at a time in order of priority, from said system memory means to corresponding FIFO memory regions of said buffer memory; and means for transmitting said framed data, stored in said FIFO memory regions of said output buffer memory, to said network while data is incoming from said system memory means to said FIFO memory regions of said buffer memory.

28. The apparatus of claim 27, including second data controller means for controlling flow of framed data from said network to corresponding FIFO memory regions of said buffer memory, and means for transmitting said framed data, stored in said FIFO memory regions of said output buffer memory, to said system memory means while data is incoming from said network to said buffer memory.

29. The apparatus of claim 27, including transmit frame detecting means for detecting the presence in said buffer memory of at least one full frame of transmit data, and means responsive to said transmit frame detecting means for transferring transmit data to said network.

30. The apparatus of claim 29, including transmit data threshold detecting means for detecting the presence in said buffer memory of at least a predetermined amount of transmit data, including means responsive to said transmit data threshold detecting means for transferring said data to said network.

31. The apparatus of claim 29, further including transmit data threshold detecting means for detecting the presence in said buffer memory of at least a predetermined amount of transmit data, and wherein said second data controller means includes means responsive to said frame detecting means and said transmit data threshold detecting means for transferring said data to said network when either at least a full frame of data or at least the predetermined amount of data is in said buffer memory.

32. For a Fiber Distributed Data Interface (FDDI) network having a plurality of processors, each including a system memory means for storing frames of data arranged in a plurality of queues, each queue having a transmit priority different from the transmit priorities of the other queues, and an optical medium forming a digital data communication path among said processors, a network controller, comprising:
 first means implementing a timed token data protocol for accessing said optical medium;
 a random access memory forming an output buffer;
 second means for configuring in said random access memory a plurality of separate logical FIFOs for respectively storing therein said plurality of queues having different transmit priorities, each of said logical FIFOs storing one of said queues;
 means for controlling flow of said framed data to corresponding logical FIFOs in said buffer memory, said framed data flow controlling means including first means for controlling flow of said framed data, one queue at a time in order of priority, from said system memory means to corresponding logical FIFOs in said buffer memory, and second means for transmitting said framed data, stored in said logical FIFOs to said medium while data is incoming from said system memory means to said FIFOs in said buffer memory.

33. The network controller of claim 32, including transmit frame detecting means for detecting the presence in said buffer memory of at least one full frame of transmit data, and means responsive to said transmit frame detecting means for transferring transmit data to said optical medium.

34. The controller of claim 33, further including transmit data threshold detecting means for detecting the presence in said buffer memory of at least a predetermined among of transmit data, and wherein said transfer means includes means responsive to said frame detecting means and said transmit data threshold detecting means for transferring said data to said optical medium when either at least a full frame of data or at least the predetermined amount of data is in said buffer memory.

35. The controller of claim 32, including transmit data threshold detecting means for detecting the presence in said buffer memory of at least a predetermined amount of transmit data, including means responsive to said transmit data threshold detecting means for transferring said data to said optical medium.

36. The controller of claim 32, wherein each said logical FIFO is defined by START and END pointers and including a READ pointer and a WRITE pointer respectively for reading data to and writing data from said logical FIFO and a SHADOW WRITE pointer pointing to the end of a full frame stored in said logical FIFO, and wherein said data flow controlling means includes means for detecting when said SHADOW WRITE pointer exceeds said READ pointer.

37. The controller of claim 36, including a register storing a data threshold value, and wherein said data flow controlling means includes means for comparing the content of said logical FIFO and said data threshold value.

38. The controller of claim 35, wherein said transmit data threshold detecting means includes means for comparing the difference between said READ pointer and said WRITE pointer with said data threshold value.

39. The controller of claim 32, including receive data threshold detecting means for detecting the presence in said logical FIFO of at least a predetermined amount of receive data from the optical medium and wherein said data flow controller means includes means responsive to said receive data threshold detecting means for transferring said receive data in said logical FIFO to said system memory means.

40. The controller of claim 32, including a physical FIFO memory establishing a single signal flow path for said framed data between said system memory means and said buffer memory.

41. For a Fiber Distributed Data Interface (FDDI) network having a plurality of processors each having system memory means for storing frames of data arranged in a plurality of different queues, the frames of each queue having a priority different from the priorities of frames of data of the other queues, an optical medium forming a digital data communication path among said processors, an output buffer memory configured to have a plurality of separate logical first in-first out (FIFO) memory regions for storing respectively the plurality of queues of framed data to be transmitted to the optical medium, and means for transmitting said framed data, stored in said logical FIFO memory regions of said output buffer memory, to said optical medium, each of the FIFO memory regions storing one of the queues:
 a method of interfacing said system memory means and said optical medium, comprising the steps of:
 accessing said optical medium upon a token capture in response to predetermined conditions, and in response,
 controlling movement of framed data to be transmitted to said optical medium by
 (a) transmitting said framed data from said system memory means to corresponding logical FIFOs in said output buffer memory, one queue at a time in order of priority, and
 (b) transmitting said framed data stored in said logical FIFOs to said optical medium while data is incoming from said system memory means to said logical FIFOs.

42. The method of claim 41, wherein said logical FIFOs include transmit and receive logical FIFOs, the method including the additional steps of detecting the presence in a transmit FIFO of at least one full packet of said data, and in response, transferring said data to said optical medium.

43. The method of claim 42, including the additional steps of detecting the presence in said transmit FIFO of at least a predetermined amount of data, and in response, transferring said data to said optical medium when either at least a packet of said data or at least the predetermined amount of data is stored in the transmit FIFO.

44. The method of claim 41, wherein said logical FIFOs include transmit and receive logical FIFOs; the method including the additional steps of detecting the presence in a transmit FIFO of at least a predetermined amount of data, and in response, transferring said data to said optical medium.

45. The method of claim 44, including the additional steps of
   detecting data incoming from the medium to be stored in the system memory means;
   transferring data from said optical medium to said receive FIFO;
   detecting a predetermined amount of data stored in said receive FIFO from said optical medium; and in response,
   transferring said data from said receive FIFO to said system memory means.

46. For a network adapter including at least one processor and system memory means for storing packets of data arranged in frames having at least data bits and an end of packet (tag) bit, a network controller, comprising:
   a random access memory;
   means for defining in said random access memory a buffer memory configured as a transmit FIFO;
   means for transferring from said system memory means to said transmit FIFO successive frames of data demarked by said end of packet (tag) bits and forming a queue to be transmitted;
   first detector means for detecting that at least one full frame of data is stored in said transmit FIFO;
   second detector means for detecting that at least a predetermined amount of data is stored in said transmit FIFO; and
   means responsive to at least one of said first and second detector means for transmitting the content of said transmit FIFO to a network;
   wherein said transmit FIFO is defined by START and END pointers and including a READ pointer and a WRITE pointer respectively for reading data to and writing data from said transmit FIFO, and a SHADOW WRITE pointer pointing to the end of a full frame stored in said transmit FIFO, wherein said first detector means includes means for detecting when said SHADOW WRITE pointer exceeds said READ pointer.

47. For a network adapter including at least one processor and system memory means for storing packets of data arranged in frames having at least data bits and an end of packet (tag) bit, a network controller, comprising:
   a random access memory;
   means for defining in said random access memory a buffer memory configured as a receive FIFO;
   means for storing in said receive FIFO incoming receive data packets demarked by said end of packet (tag) bits and forming a receive queue;
   means for storing a receive data threshold value;
   means for detecting that the content of said receive FIFO exceeds said receive data threshold value; and
   means responsive to said detecting means for transferring data from said receive FIFO to said system memory means;
   wherein said receive FIFO is defined by START and END pointers, and including READ and WRITE pointers, a SHADOW WRITE pointer pointing to the beginning of the latest frame being received in the receive FIFO, and a receive threshold value, wherein said receive data is transferred to said system memory means when said write pointer exceed said threshold value and when said receive data is to be flushed, the write pointer is replaced by the shadow write pointer.

48. For a Fiber Distributed Data Interface (FDDI) network having a plurality of processors, each including a system memory means for storing frames of data arranged in queues and having a plurality of different transmit priorities, and an optical medium forming a digital data communication path among said processors, a network controller, comprising:
   first means implementing a timed token data protocol for accessing said optical medium;
   a random access memory forming a buffer memory; and
   second means for configuring in said random access memory a plurality of logical FIFOs for storing therein said queued frames of data having respectively said plurality of different transmit priorities;
   means for controlling flow of said framed data to corresponding logical FIFOs in said buffer memory, said framed data flow controlling means including first means for controlling flow of said framed data, one queue at a time in order of priority, from said system memory means to corresponding logical FIFOs in said buffer memory, and second means for transmitting said framed data, stored in said logical FIFOs to said medium while data is incoming from said system memory means to said FIFOs in said buffer memory;
   wherein each said logical FIFO is defined by START and END pointers and including a READ pointer and a WRITE pointer respectively for reading data to and writing data from said logical FIFO and a SHADOW WRITE pointer pointing to the end of a full frame stored in said logical FIFO, and wherein said data flow controlling means includes means for detecting when said SHADOW WRITE pointer exceeds said READ pointer.

* * * * *